(12) United States Patent
Park et al.

(10) Patent No.: US 9,136,790 B2
(45) Date of Patent: Sep. 15, 2015

(54) INVERTER CONTROL APPARATUS AND CONTROL METHOD THEREOF

(71) Applicants: SAMSUNG ELECTRONICS CO., LTD, Suwon-si, Gyeonggi-do (KR); SNU R&DB FOUNDATION, Seoul (KR)

(72) Inventors: Young Jae Park, Yongin-si (KR); Han Sol Seo, Seoul (KR); Bodrov Alexey, Suwon-si (KR); Seung Ki Sul, Seoul (KR); Hyun-Sam Jung, Bucheon-si (KR); Seung-Jun Chee, Seongnam-si (KR)

(73) Assignees: SAMSUNG ELECTRONICS CO., LTD., Suwon-Si (KR); SNU R&DB FOUNDATION, Seoul (KR)

(*) Notice: Subject to any disclaimer, the term of this patent is extended or adjusted under 35 U.S.C. 154(b) by 176 days.

(21) Appl. No.: 13/684,316

(22) Filed: Nov. 23, 2012

(65) Prior Publication Data

US 2014/0028237 A1 Jan. 30, 2014

(30) Foreign Application Priority Data

Jul. 25, 2012 (KR) .................. 10-2012-0081486

(51) Int. Cl.
| | |
|---|---|
| H02P 1/00 | (2006.01) |
| H02P 27/00 | (2006.01) |
| H02P 27/06 | (2006.01) |
| H02P 21/14 | (2006.01) |
| H02M 1/42 | (2007.01) |

(52) U.S. Cl.
CPC .............. *H02P 27/06* (2013.01); *H02P 21/146* (2013.01); *H02M 1/4208* (2013.01); *H02P 2207/05* (2013.01); *Y02B 70/126* (2013.01)

(58) Field of Classification Search
CPC ...... H02P 27/06; H02P 21/0035; H02P 27/08; H02P 6/08; H02P 21/146; H02P 2207/05; H02P 6/001; H02M 1/4208; H02M 1/126; H02M 1/4233; Y02B 70/126
USPC .......................... 318/807, 254, 400.02, 504
See application file for complete search history.

(56) References Cited

U.S. PATENT DOCUMENTS

| | | | | |
|---|---|---|---|---|
| 7,053,569 | B2* | 5/2006 | Takahashi et al. ........ | 318/400.27 |
| 8,106,620 | B2* | 1/2012 | Kitanaka ........................ | 318/807 |
| 2008/0104983 | A1* | 5/2008 | Yamai et al. ................. | 62/228.1 |
| 2010/0308757 | A1* | 12/2010 | Ide et al. ................... | 318/400.02 |
| 2011/0101898 | A1* | 5/2011 | Shinomoto et al. ........ | 318/400.3 |

FOREIGN PATENT DOCUMENTS

JP 2003-061382 * 2/2003 ................ H02P 6/08

* cited by examiner

*Primary Examiner* — Bentsu Ro
*Assistant Examiner* — Zemenay Truneh
(74) *Attorney, Agent, or Firm* — Staas & Halsey LLP

(57) ABSTRACT

An inverter control apparatus and a control method thereof are provided. The inverter control apparatus and a control method thereof stably operate a three-phase motor using a capacitor having a small capacitance for a DC link. The inverter control apparatus includes a current sensor to sense an output current of the inverter, a voltage sensor to sense a DC-link voltage of the inverter, and a controller to generate an average of a periodically varying rotor based q-axis current boundary value based on the output current and the DC-link voltage to generate a current reference on the basis of the average of the rotor based q-axis current boundary value, and to drive a three-phase motor based on the current reference. Stabilized variable speed control of a motor by using a small-capacitance capacitor for a DC link of an inverter is performed and reliability of an inverter circuit improved.

25 Claims, 19 Drawing Sheets

INVERTER CONTROL APPARATUS AND CONTROL METHOD THEREOF

CROSS-REFERENCE TO RELATED APPLICATIONS

This application is related to, and claims priority to, Korean Patent Application No. 2012-81486, filed on Jul. 25, 2012 in the Korean Intellectual Property Office, the disclosure of which is incorporated herein by reference.

BACKGROUND

1. Field

Embodiments of the present invention relate to an inverter control apparatus and a control method thereof and, more particularly, to an inverter control apparatus and a control method thereof to stably operate a three-phase motor using a capacitor having a small capacitance for a DC link.

2. Description of the Related Art

FIG. 1 illustrates a waveform of a conventional q-axis current reference.

Referring to FIG. 1, a DC-link voltage waveform a1, a q-axis current reference waveform a2 in a trapezoidal form, and a q-axis current reference waveform a3 in a sine squared form are illustrated.

To stably operate a permanent magnet synchronous motor with an inverter using a small-capacitance capacitor, it is important to generate a rotor based q-axis current reference and a rotor based d-axis current reference.

Rotor based q-axis current reference may be modulated into a sine squared form and a rotor based q-axis current reference may be modulated into a trapezoidal form.

However, the method of modulating a rotor based q-axis current reference into a sine squared form does not consider a voltage drop due to inductance and stator resistance and needs an additional methodology for measuring the voltage of input power, such as a voltage sensor.

The method of modulating a rotor based q-axis current reference into a trapezoidal form cannot eliminate harmonic components of an input current.

In conventional methods, the rotor based d-axis current reference uses a voltage equation (Equation 1) and voltage limit equation (Equation 2), or a d-axis current is controlled to have a negative value in a specific region having an insufficient DC-link voltage.

$$V_{ds}^r = R_s i_{ds}^r + L_d \frac{d}{dt} i_{ds}^r - \omega_r L_q i_{qs}^r \quad \text{[Equation 1]}$$

$$V_{qs}^r = R_s i_{qs}^r + L_q \frac{d}{dt} i_{qs}^r + \omega_r (L_d i_{ds}^r + \lambda_{pm})$$

$$\frac{V_{dc}}{\sqrt{3}} \geq \sqrt{V_{ds}^{r*2} + V_{qs}^{r*2}} \quad \text{[Equation 2]}$$

However, when a small-capacitance capacitor may be used for a DC link of an inverter, the DC link voltage of the inverter pulsates at double a source frequency, and thus a voltage limit circle varies even in a steady state. Accordingly, instantaneous change of the d-axis current deteriorates system stability.

SUMMARY

Additional aspects and/or advantages will be set forth in part in the description which follows and, in part, will be apparent from the description, or may be learned by practice of the invention.

It is an aspect of the present invention to provide a method to generate a rotor based q-axis current reference and a rotor based d-axis current reference using an "average voltage limit circle" to reduce pulsation of a DC link voltage.

It is an aspect of the present invention to provide a method to estimate a system frequency such that a rotor based q-axis current reference has a sine squared form of the system frequency (source frequency) when the power factor of input power needs to be controlled to be 1 to satisfy regulation of harmonics of input current.

In accordance with an aspect of the present invention, an inverter control apparatus is provided that controls an inverter having a DC-link voltage pulsating at double a system frequency, the inverter control apparatus including a current sensor to sense an output current of the inverter, a voltage sensor to sense a DC-link voltage of the inverter, and a controller to generate the average of a periodically varying rotor based q-axis current boundary value on the basis of the output current and the DC-link voltage, to generate a current reference on the basis of the average of the rotor based q-axis current boundary value, and to drive a three-phase motor on the basis of the current reference.

The controller may include a velocity controller to generate an output torque command value on the basis of the output current; and a current reference generator to generate the current reference corresponding to the output torque command value.

The current reference generator may include a system angle estimator to estimate at least one of a system angle, a system frequency, a double system angle and a double system frequency on the basis of the DC-link voltage.

The current reference generator may further include a q-axis current reference generator to generate a rotor based q-axis current reference in a sine squared form, which is synchronized with the system angle, on the basis of the system angle.

The current reference generator may include a d-axis current reference generator to calculate an average of the periodically varying rotor based q-axis current boundary value and to generate a rotor based d-axis current reference on the basis of the average of the rotor based q-axis current boundary value and the rotor based q-axis current reference.

The system angle estimator may include a DC-link voltage square calculator to square the DC-link voltage to generate a DC-link voltage square, a band pass filter to generate a double system frequency component value having a frequency twice the system frequency on the basis of the DC-link voltage square and the double system frequency, a phase retarder to generate a 90° phase-retarded value having a phase retarded by 90° from the double system frequency component value, a fifth frame converter to generate a synchronous reference frame based d-axis virtual voltage and a synchronous reference frame based q-axis virtual voltage, which are constants and have a phase difference therebetween, on the basis of the 90°-phase-retarded value, a value obtained by multiplying the double system frequency component value by "−1", and the double system angle, and a phase lock unit to generate at least one of the system angle, the system frequency, the double system angle, and the double system frequency on the synchronous reference frame based d-axis virtual voltage and a constant value "0".

The phase lock unit may include an all-pass filter or a secondary general integrator to retard a phase.

The phase lock unit may include a phase lock loop to lock the phase of a received signal and keep the frequency of an output signal uniform.

The q-axis current reference generator may include a sine square calculator to generate a unit sine square waveform having the system angle, a q-axis current reference converter to generate a q-axis current reference corresponding to the output torque command value, a first multiplier to multiply the unit sine square waveform by the q-axis current reference to generate a q-axis current reference in a sine squared form, a current gain setting unit to generate a current gain that makes the average of the output torque command value equal to the average of a current reference modified torque generated according to the rotor based q-axis current reference, and a second multiplier to multiply the q-axis current reference in a sine squared form by the current gain to generate a rotor based q-axis current reference.

The current gain setting unit may set the current gain to a value of "2".

The d-axis current reference generator may include a current margin calculator to calculate the average of the periodically varying rotor based q-axis current boundary value on the basis of the DC-link voltage and to generate a rotor based q-axis current margin value on the basis of the average of the rotor based q-axis current boundary value, a current margin reference unit to generate a rotor based q-axis current margin reference on the basis of the output torque command value, and a first adder to generate an error value by subtracting the rotor based q-axis current margin reference from the rotor based q-axis current margin value.

The current margin calculator may include a d-axis voltage boundary value calculator to generate a rotor based d-axis voltage boundary value corresponding to a maximum instantaneous voltage that can be applied to a d axis on the basis of the DC-link voltage, a unit gain calculator to generate a unit gain that changes a voltage value into a current value, a q-axis current boundary converter to generate a rotor based q-axis current boundary value on the basis of the rotor based d-axis voltage boundary value and the unit gain, and a q-axis current margin calculator to subtract the rotor based q-axis current reference from the average of the rotor based q-axis current boundary value to generate a rotor based q-axis margin value.

The current margin reference unit may set the rotor based d-axis current reference to a positive value such that the rotor based d-axis current reference is set to a negative value when a generated torque is insufficient due to current limitation.

The current margin reference unit may set the rotor based q-axis current margin reference to "0" in a steady state or when current is not limited.

In accordance with an aspect of the present invention, a method to control an inverter control apparatus that includes a current sensor, a voltage sensor and a controller and controls an inverter having a DC-link voltage pulsating at double a system frequency includes the inverter control apparatus sensing an output current and a DC-link voltage of the inverter, the inverter control apparatus calculating the average of a periodically varying rotor based q-axis current boundary value on the basis of the output current and the DC-link voltage, the inverter control apparatus generating a current reference on the basis of the average of the rotor based q-axis current boundary value, and the inverter control apparatus driving a three-phase motor on the basis of the current reference.

The inverter control apparatus generating the current reference may include estimating at least one of a system angle, a system frequency, a double system angle and a double system frequency on the basis of the DC-link voltage.

The inverter control apparatus generating the current reference further may include generating a rotor based q-axis current reference in a sine squared form, which is synchronized with the system angle, on the basis of the system angle.

The inverter control apparatus generating the current reference may further include generating a rotor based d-axis current reference on the basis of the average of the rotor based q-axis current boundary value and the rotor based q-axis current reference.

The inverter control apparatus estimating at least one of the system angle, the system frequency, the double system angle and the double system frequency may include: squaring the DC-link voltage to generate a DC-link voltage square, generating a double system frequency component value having a frequency twice the system frequency on the basis of the DC-link voltage square and the double system frequency, generating a 90° phase-retarded value having a phase retarded by 90° from the double system frequency component value, generating a synchronous reference frame based d-axis virtual voltage and a synchronous reference frame based q-axis virtual voltage, which are constants and have a phase difference therebetween, on the basis of the 90°-phase-retarded value, a value obtained by multiplying the double system frequency component value by "−1", and the double system angle, and generating at least one of the system angle, the system frequency, the double system angle, and the double system frequency on the synchronous reference frame based d-axis virtual voltage and constant "0".

The inverter control apparatus generating the rotor based q-axis current reference may include: generating a unit sine square waveform having the system angle, generating a q-axis current reference corresponding to the output torque command value, multiplying the unit sine square waveform by the q-axis current reference to generate a q-axis current reference in a sine squared form, generating a current gain that makes the average of the output torque command value equal to the average of a current reference modified torque generated according to the rotor based q-axis current reference, and multiplying the q-axis current reference in a sine squared form by the current gain to generate a rotor based q-axis current reference.

The current gain setting unit may set the current gain to a value of "2".

The inverter control apparatus generating the rotor based d-axis current reference may include: generating a rotor based d-axis voltage boundary value corresponding to a maximum instantaneous voltage that can be applied to a d axis on the basis of the DC-link voltage, generating a unit gain that changes a voltage value into a current value, generating a rotor based q-axis current boundary value on the basis of the rotor based d-axis voltage boundary value and the unit gain, subtracting the rotor based q-axis current reference from the average of the rotor based q-axis current boundary value to generate a rotor based q-axis margin value, generating a rotor based q-axis current margin reference on the basis of the output torque command value, generating an error value by subtracting the rotor based q-axis current margin reference from the rotor based q-axis current margin value, and sequentially applying the error value to a low pass filter and a proportional integrator to generate a rotor based d-axis current reference.

The inverter control apparatus generating the rotor based d-axis current reference may include setting the rotor based d-axis current reference to a positive value such that the rotor based d-axis current reference is set to a negative value when generated torque is insufficient due to current limitation.

The inverter control apparatus generating the rotor based d-axis current reference may include setting the rotor based q-axis current margin reference to "0" in a steady state or when current is not limited.

According to embodiments of the invention, it is possible to perform stabilized variable speed control of a motor by using a small-capacitance capacitor for a DC link of an inverter and to improve reliability of an inverter circuit. Furthermore, a circuit for initially charging a capacitor C an be eliminated using the small-capacitance capacitor.

According to embodiments of the invention, an additional circuit for power factor improvement can be removed by using a method to estimate a system frequency.

As described above, according to embodiments of the invention, it is possible to reduce costs and improve reliability of products by decreasing the number of components.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
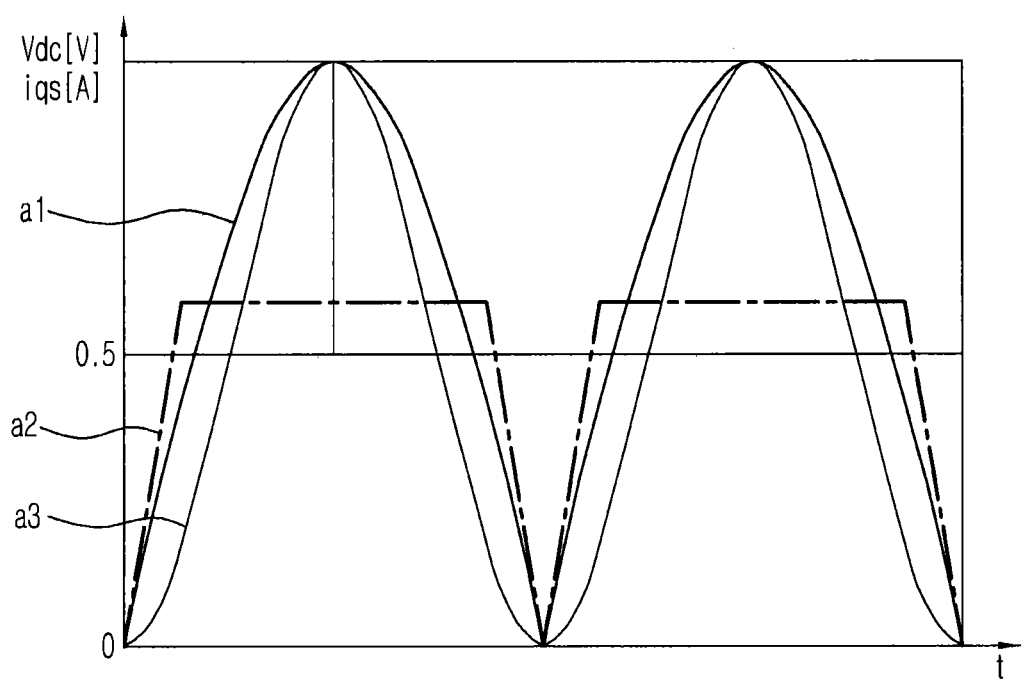
FIG. 1 illustrates the waveform of a conventional q-axis current reference.

Reference will now be made in detail to the embodiments of the present invention, examples of which are illustrated in the accompanying drawings, wherein like reference numerals refer to like elements throughout.

Figure 2:
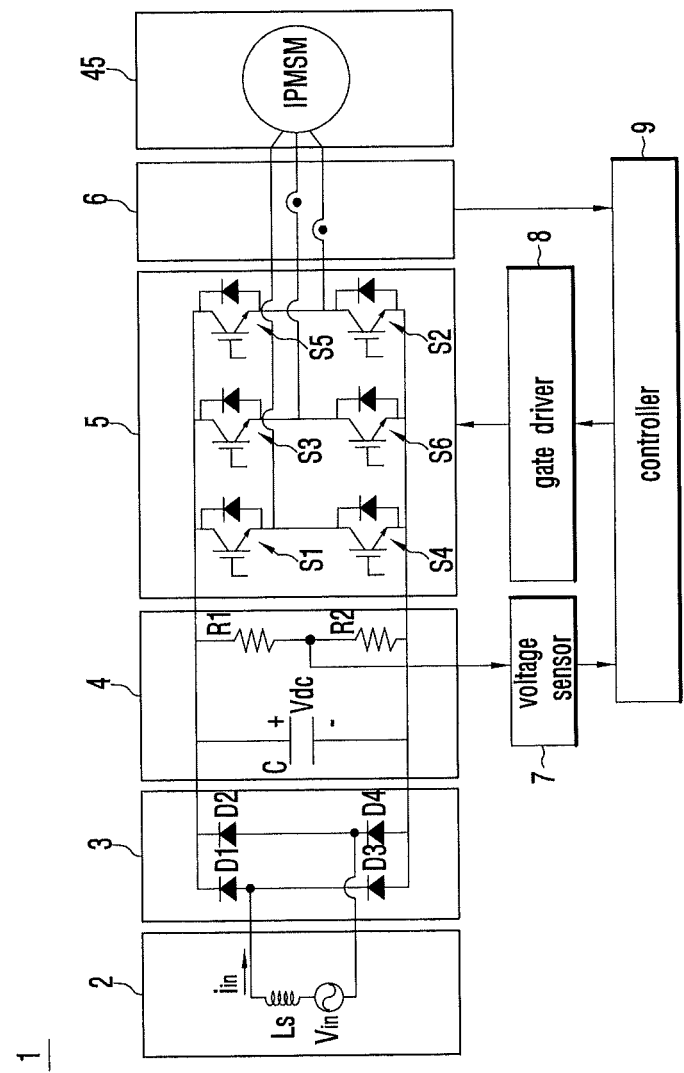
FIG. 2 illustrates an inverter control apparatus according to an embodiment of the present invention.

FIG. 2 illustrates an inverter control apparatus according to an embodiment of the present invention.

The inverter control apparatus 1 according to an embodiment of the present invention drives a three-phase motor and controls an inverter having a DC-link voltage that pulsates at a frequency twice a system frequency and includes a current sensor, a voltage sensor and a controller. The controller receives an inverter output current value from the current sensor and accepts an inverter DC-link voltage value from the voltage sensor to estimate a system angle or a system frequency. The controller generates a rotor based q-axis current reference in a sine squared form, which is synchronized with the system angle, averages a periodically varying voltage limit value for a half cycle of the system frequency to generate an average q-axis current value, and generates a rotor based q-axis current reference on the basis of the average q-axis current value.

A three-phase motor 45 may be a permanent magnet synchronous motor, but is not limited thereto.

A power supply unit 2 supplies single-phase AC power. The power supply unit 2 may include a single-phase input power supply Vin and an internal inductor Ls.

A rectifier 3 may convert AC input from the power supply unit 2 to DC. The rectifier 3 can execute a rectification function of passing current only in one direction owing to small forward resistance and sufficiently large reverse resistance thereof. The rectifier 3 includes a full-bridge diode rectifier using 4 diodes D1 to D4.

A DC link 4 may include a capacitor C that stores a DC voltage converted by the rectifier 3 and 2 resistors R1 and R2 connected in series.

The capacitor C can charge the DC voltage converted by the rectifier 3 and discharge the charged DC voltage through the resistors R1 and R2.

A time taken to charge and discharge the DC voltage depends on the capacitance of the capacitor C. That is, the time taken to discharge the voltage increases as the capacitance of the capacitor C increases.

Accordingly, the capacitor C can smooth a half-wave-rectified voltage waveform applied thereto when the capacitor C has a large capacitance. That is, the capacitor C can convert a ripple current with a varying voltage into a specific voltage.

However, the present invention provides a function of stably controlling the three-phase motor 45 when the capacitor C has a small capacitance.

When the capacitor C has a small capacitance, the voltage charged in the capacitor C has large pulsation because the voltage rapidly discharges.

In this case, the capacitor C has a capacitance of 5 µF to tens of µF. The capacitor may include a film capacitor.

An inverter constructed such that an electrolytic capacitor is not used for the DC link by reducing the capacitance of the DC-link capacitor C to 5 to tens of µF from 1000 to thousands of µF is called a single-phase electrolytic capacitor-less inverter.

The rectified voltage Vdc has large pulsation because of the small-capacitance capacitor C. Accordingly, embodiments of the present invention can reduce harmonics of the input current and improve the power factor by appropriately setting a switching signal.

The voltage charged in the capacitor C is applied to the 2 resistors R1 and R2 connected in series to the capacitor C depending on the ratio of the 2 resistors R1 and R2 according to the voltage divider rule.

An inverter 5 can convert DC power to AC power. The inverter 5 can convert the DC voltage stored in the DC link 4 to an AC voltage having a frequency and size depending on a load condition.

The inverter 5 includes 6 switches S1 to S6. The inverter 5 can generate three-phase AC by turning on or off the 6 switches S1 to S6 when a switch on or off signal is supplied thereto from a gate driver 8.

The switches S1 to S6 may include switching transistors used as circuit switching elements.

Three-phase AC is AC with respect to three electromotive forces having the same frequency and different phases. In general, three-phase AC indicates AC flowing according to symmetrical three-phase electromotive forces and includes three sinusoidal alternating currents having a phase difference of 120° and the same amplitude.

The current sensor 6 can sense the output current of the inverter 5. The output current of the inverter 5 is applied to the three-phase motor 45.

The current sensor 6 may use a 3-shunt or 1-shunt scheme in which a shunt resistor is added to lower switches and ground of the inverter 5.

The current sensor 6 can sense a three-phase motor (45) current (two or three phases among a phase, b phase and c phase) and transmit a sensed output current value to the controller 9. Specifically, the current sensor 6 can transmit the output current value to an A/D converter (not shown) of the controller 9.

The voltage sensor 7 can sense the voltage of the DC link 4. The voltage charged in the capacitor C is applied to the resistors R1 and R2 of the DC link 4 and the voltage sensor 7 can detect the voltage charged in the capacitor C by sensing a voltage applied to one of the resistors R1 and R2.

When the small-capacitance capacitor C is used, the voltage of the capacitor C pulsates and the voltage sensor 7 can sense the pulsating voltage.

The voltage sensor 7 can sense the voltage of the DC link 4 and transmit the sensed voltage value to the controller 7.

The gate driver 8 receives a switching control signal from the controller 9 and transmits a signal for turning the switches S1 to S6 on or off to the inverter 5.

The controller 9 receives information on the sensed current from the current sensor 6, receives information on the sensed voltage from the voltage sensor 7 and generates a rotor based q-axis current reference and a rotor based d-axis current reference.

The controller 9 generates a switching signal for stably driving the three-phase motor 45 using the rotor based q-axis current reference and rotor based d-axis current reference and transmits the switching signal to the gate driver 8.

The controller 9 is described in detail.

Figure 3:
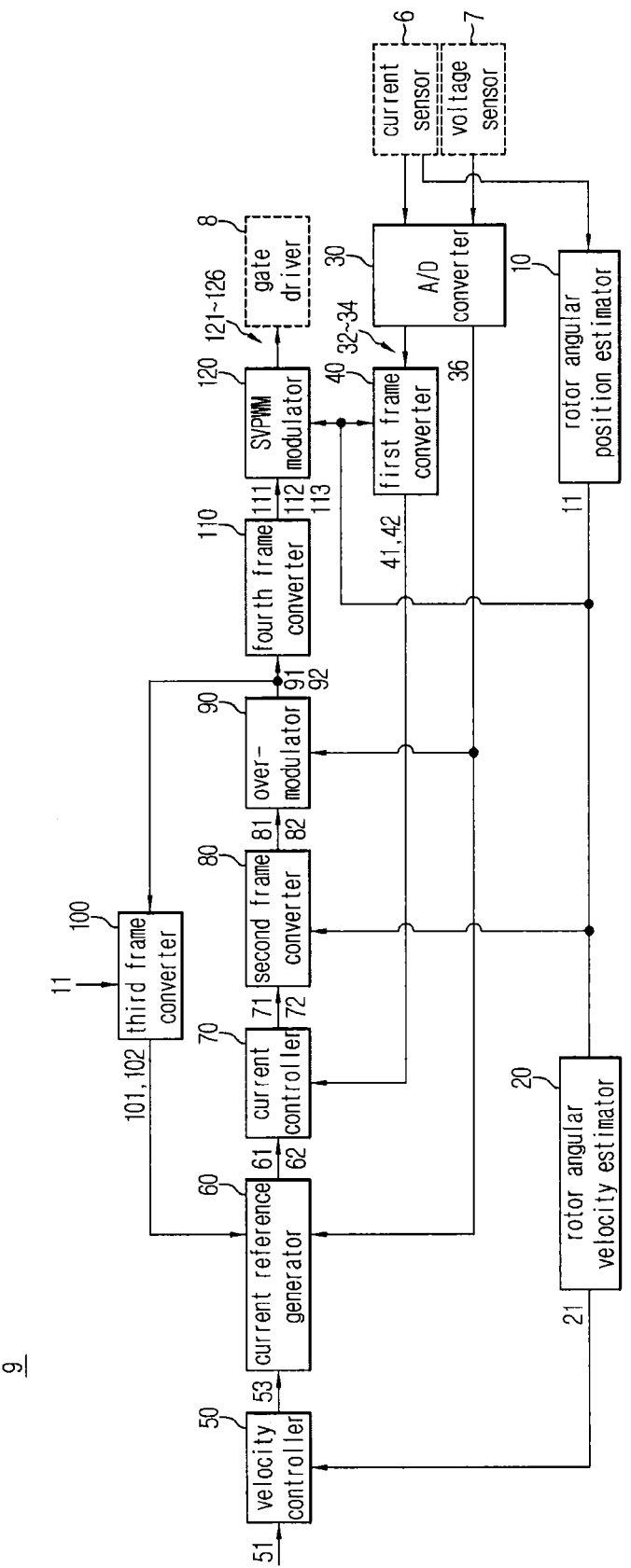
FIG. 3 illustrates a controller according to an embodiment of the present invention.

FIG. 3 illustrates the controller according to an embodiment of the present invention.

A rest frame based on a stator and a synchronous reference frame rotating at a synchronous speed may be used as a reference frame to solve complexity of a time-varying differential equation included in the voltage equation of an AC motor and to analyze a transient state.

In the following description, superscript "r" denotes rotor base (synchronous reference frame), superscript "s" denotes a stator base (rest frame), subscript "*" represents a reference, superscript "r*" represents a rotor base (synchronous frame) reference value, and subscript "s" denotes a stator of a motor.

The controller 9 may include a rotor angular position estimator 10, a rotor angular velocity estimator 20, an A/D converter 30, a first frame converter 40, a velocity controller 50, a current reference generator 60, a current controller 70, a second frame converter 80, an over-modulator 90, a third frame converter 100, a fourth frame converter 110, and an SVPWM modulator 120.

The rotor angular position estimator 10 can estimate the position of a rotor without using a position sensor.

The rotor angular position estimator 10 can generate a rotor angular position estimate 11 ($\theta_r$).

The rotor angular velocity estimator 20 can generate a rotor angular velocity estimate 21 ($\omega_r$) by differentiating the rotor angular position estimate 11 transmitted from the rotor angular position estimator 10.

The A/D converter 30 can convert an analog signal to a digital signal.

The A/D converter 30 can receive an output phase current sense signal of the inverter 5, which is an analog signal, from the current sensor 6 and generate three-phase motor input phase current values 32, 33 and 34 corresponding to digital signals.

The A/D converter 30 can receive a voltage sense signal of the DC link 4, which corresponds to an analog signal, from the voltage sensor 7 and generate a DC-link voltage 36 corresponding to a digital signal.

In the following, it is assumed that the three-phase motor input phase current values 32, 33 and 34 are received from the current sensor 6 and the DC-link voltage 36 is received from the voltage sensor 7 for convenience of description.

The first frame converter 40 frame-converts the three-phase motor input phase current values 32, 33 and 34 to rotor based two-phase current 41 and 42.

The first frame converter 40 receives the three-phase motor input phase current values 32, 33 and 34 from the current sensor 6 and receives the rotor angular position estimate 11 from the rotor angular position estimator 10. The first frame converter 40 can generate the rotor based d-axis current value 41 and the rotor based q-axis current value 42, which are constants having a phase difference of 90° therebetween.

The velocity controller 50 can receive a rotor angular velocity reference 51 from a main MCU of the system or generate the rotor angular velocity reference 51. The velocity controller 50 can receive the rotor angular velocity estimate 21 from the rotor angular velocity estimator 20.

The velocity controller 50 can generate an output torque command value 53 corresponding to an angular velocity necessary for the rotor angular velocity estimate 21 to track the rotor angular velocity reference 51.

The output torque command value 53 may be a value obtained by subtracting an anti-wind up value corresponding to a torque generated due to current limitation from an actually necessary torque.

The current reference generator 60 may receive the output torque command value 53 from the velocity controller 50, receive a rotor based d-axis voltage limit value 101 and a rotor based q-axis voltage limit value 102 from the third frame converter 100, and accept the DC-link voltage 36 from the voltage sensor 7.

The current reference generator 60 can generate a rotor based d-axis current reference 61 and a rotor based q-axis current reference 62 corresponding to the output torque command value 53.

The current reference generator 60 is described in detail.

The current controller 70 can receive the rotor based d-axis current reference 61 and the rotor based q-axis current reference 62 from the current reference generator 60 and receive the rotor based d-axis current value 41 and the rotor based q-axis current value 42 from the first frame converter 40.

The current controller 70 can generate a rotor based d-axis voltage reference 71 and a rotor based q-axis voltage reference 72, which respectively correspond to the rotor based d-axis current reference 61 and the rotor based q-axis current reference 62.

The second frame converter 80 can receive the rotor based d-axis voltage reference 71 and the rotor based q-axis voltage reference 72 from the current controller 70 and accept the rotor angular position estimate 11 from the rotor angular position estimator 10.

The second frame converter 80 can generate a stator based d-axis voltage reference 81 and a stator based q-axis voltage reference 82, which have a phase difference of 90° therebetween and respectively correspond to the rotor based d-axis voltage reference 71 and the rotor based q-axis voltage reference 72.

The over-modulator 90 can receive the stator based d-axis voltage reference 81 and the stator based q-axis voltage reference 82 from the second frame converter 80 and accept the DC-link voltage 36 from the voltage sensor 7.

The over-modulator 90 can generate a stator based d-axis voltage limit value 91 and a stator based q-axis voltage limit value 92 which respectively correspond to the stator based d-axis voltage reference 81 and the stator based q-axis voltage reference 82.

The third frame converter 100 can receive the stator based d-axis voltage limit value 91 and the stator based q-axis voltage limit value 92 from the over-modulator 90 and accept the rotor angular position estimate 11 from the rotor angular position estimator 10.

The third frame converter 100 can generate the rotor based d-axis voltage limit value 101 and the rotor based q-axis voltage limit value 102 which have a phase difference of 90° therebetween and respectively correspond to the stator based d-axis voltage limit value 91 and the stator based q-axis voltage limit value 92.

The fourth frame converter 110 can receive the stator based d-axis voltage limit value 91 and the stator based q-axis voltage limit value 92 from the over-modulator 70.

The fourth frame converter 110 can generate three-phase voltage references 111, 112 and 113 corresponding to three-phase AC.

The SVPWM modulator 120 can receive the three-phase voltage references 111, 112 and 113 from the fourth frame converter 110 and accept the rotor angular position estimator 11 from the rotor angular position estimator 10.

The SVPWM modulator 120 can generate switching control signals 121 to 126 for controlling the 6 switches (not shown) of the inverter 5, which correspond to the three-phase voltage references 111, 112 and 113.

Figure 4:
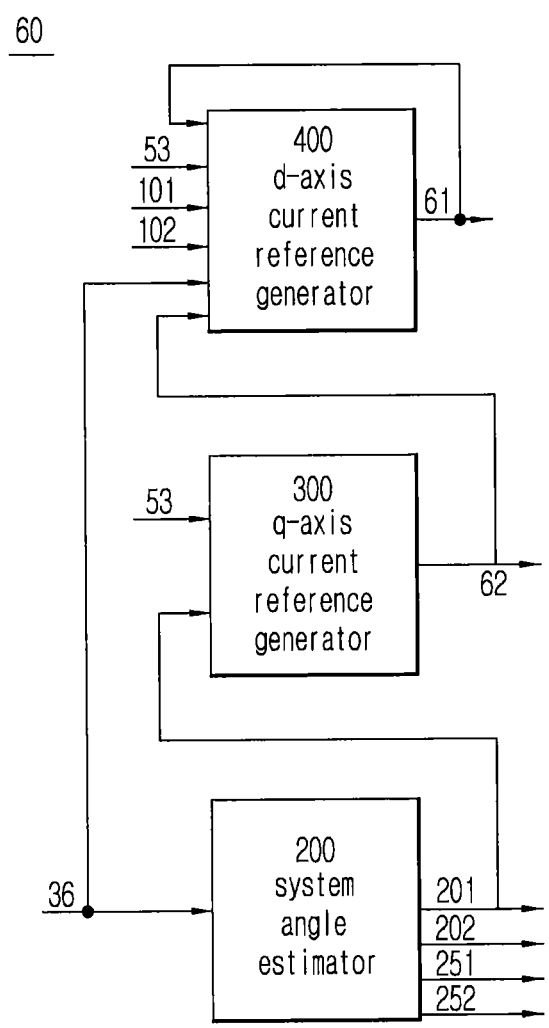
FIG. 4 illustrates a current reference generator according to an embodiment of the present invention.

FIG. 4 illustrates a current reference generator according to an embodiment of the present invention.

The current reference generator 60 according to an embodiment of the present invention can take an error in motor parameters of the motor voltage equation into account even if the current reference generator 60 is not aware of the motor parameters, and provide a high-reliability control method through system angle estimation.

Referring to FIG. 4, the current reference generator 60 includes a system angle estimator 200, a q-axis current reference generator 300 and a d-axis current reference generator 400.

The system angle estimator 200 can receive the DC-link voltage 36 from the voltage sensor 7. The system angle estimator 200 can generate a system angle 201, a system frequency 202, a double system angle 251 and a double system frequency 252.

The q-axis current reference generator 300 can receive the output torque command value 53 from the velocity controller (not shown) and accept the system angle 201 from the system angle estimator 200. The q-axis current reference generator 300 can generate the rotor based q-axis current reference 62 in a sine squared form, which is synchronized with the system angle.

The d-axis current reference generator 400 can receive the output torque command value 53 from the velocity controller, receive the DC-link voltage 36 from the voltage sensor 7, accept the rotor based q-axis current reference 62 from the q-axis current reference generator 300, and accept the rotor based d-axis voltage limit value 101 and the rotor based q-axis voltage limit value 102 from the third frame converter (not shown). The d-axis current reference generator 400 can receive the rotor based d-axis current reference value 61 through feedback.

The d-axis current reference generator 400 can generate the rotor based d-axis current reference 61.

Figure 5A:
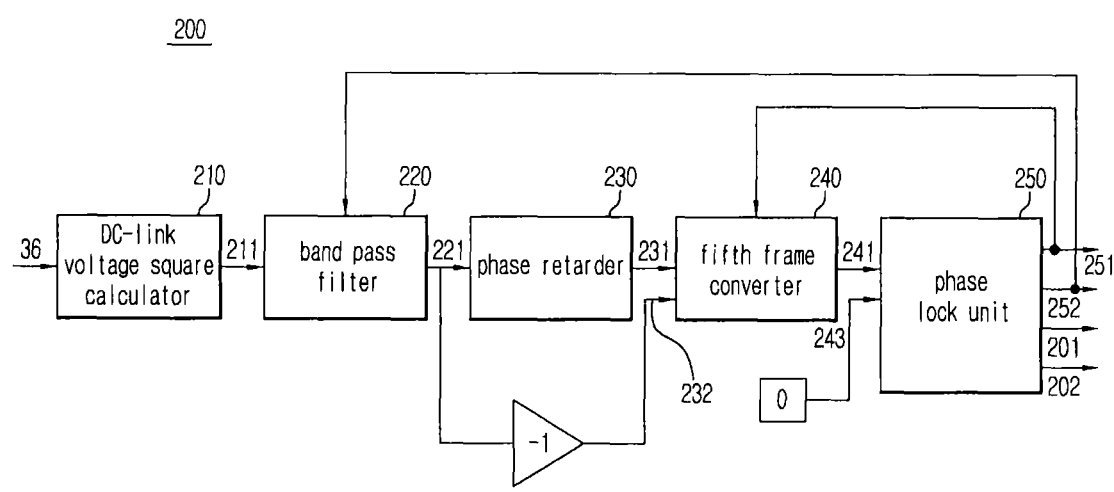
FIG. 5A illustrates a system angle estimator according to an embodiment of the present invention.

FIG. 5A illustrates a system angle estimator.

The system angle estimator 200 can estimate the system angle 201 of the input power voltage using the DC-link voltage 36 rather than measuring the input power voltage using an additional voltage measurement sensor.

Referring to FIG. 5A, the system angle estimator 200 can receive the DC-link voltage 36 and generate the system angle 201, the system frequency 202, the double system angle 251 and the double system frequency 252.

The system angle estimator 200 may include a DC-link voltage square calculator 210, a band pass filter 220, a phase retarder 230, a fifth frame converter 240, and a phase lock unit 250.

The DC-link voltage square calculator 210 can receive the DC-link voltage 36 from the voltage sensor 7 and generate a DC-link voltage square 211. The DC-link voltage square 211 may be obtained by squaring the DC-link voltage 36.

The band pass filter 220 can receive the DC-link voltage square 211 from the DC-link voltage square calculator 2100 and accept double system frequency 252 ($2\omega_{grid}$) from the phase lock unit 250. The band pass filter 220 can generate a double system frequency component value 221 ($V_{dc\_2\omega_{grid}}$) of the DC-link voltage square 211.

The band pass filter 220 has a frequency twice the system frequency as the center frequency thereof.

For example, the band pass filter 220 can set the frequency twice the system frequency (50 Hz or 60 Hz) to an initial value, and use the double system frequency 252 ($2\omega_{grid}$) by feeding back the same in cases other than a case in which the motor is driven.

The band pass filter 220 can perform a calculation according to Equation 3.

$$V_{dc\_2\omega_{grid}} = BPF(V_{dc}^2, 2\omega_{grid})$$

In Equation 3, $V_{dc}^2$ denotes the DC-link voltage square, $\omega_{grid}$ denotes the system frequency, and $V_{dc\_2\omega_{grid}}$ represents the double system frequency component value 221 of the DC-link voltage square 211, which is the voltage value after passing through the band pass filter 220 having the double system frequency as the center frequency thereof.

When the DC-link voltage 36 is squared, a component cos 2θ$_e$ exists in the DC-link voltage square and this value can pass through the band pass filter 220 having the double system frequency as the center frequency thereof.

The phase retarder 230 can receive the double system frequency component value 221 of the DC-link voltage square 211 from the band pass filter 220. The phase retarder 230 can generate a 90° phase-retarded value 231 ($V_{dc\_2\omega_{grid}}(\theta-90°)$) having a phase retarded by 90° from the double system frequency component value 221.

The phase retarder 230 performs calculation according to Equation 4.

$$V_{dc\_2\omega_{grid}}(\theta-90°)=SOGI(V_{dc\_2\omega_{grid}})$$

$$\text{or } V_{dc\_2\omega_{grid}}(\theta-90°)=APF(V_{dc\_2\omega_{grid}}) \quad \text{Equation 4}$$

In Equation 4, $V_{dc\_2\omega_{grid}}$ denoted the double system frequency component value 221 of the DC-link voltage square 211, SOGI (Second Order General Integrator) denotes a secondary general integrator, APF represents an all-pass filter, and $V_{dc\_2\omega_{grid}}(\theta-90°)$ represents the 90° phase-retarded value 231.

For example, the phase retarder 230 can include an all-pass filter or a secondary general integrator.

The fifth frame converter 230 can receive the 90° phase-retarded value 231 from the phase retarder 230, receive a value obtained by multiplying the double system frequency component value 221 ($V_{dc\_2\omega_{grid}}$) of the DC-link voltage square 211 by "−1" from the band pass filter 220, and accept the double system angle 251 (2θ$_g$) from the phase lock unit 250.

A stator based d-axis virtual voltage 231 ($V_{dc\_ds}^S$) and a stator based q-axis virtual voltage 232 ($V_{dc\_qs}^S$) can be defined by Equation 5.

$$V_{dc\_ds}^S=V_{dc\_2\omega_{grid}}(\theta-90°)$$

$$V_{dc\_qs}^S=-V_{dc\_2\omega_{grid}} \quad \text{Equation 5}$$

In Equation 5, $V_{dc\_ds}^S$ denotes the stator based d-axis virtual voltage 231 and $V_{dc\_2\omega_{grid}}(\theta-90°)$ denotes the 90° phase-retarded value 231. The stator based d-axis virtual voltage 231 and the 90° phase-retarded value 231 use the same reference numeral for convenience. $V_{dc\_qs}^S$ represents the stator based q-axis virtual voltage 232 and $V_{dc\_2\omega_{grid}}$ represents the double system frequency component value 221 of the DC-link voltage square 211.

The stator based q-axis virtual voltage 232 corresponds to a value obtained by multiplying the double system frequency component value 221 of the DC-link voltage square 211 by "1".

The fifth frame converter 240 can generate a synchronous reference frame based d-axis virtual voltage 241 and a synchronous reference frame based q-axis virtual voltage (not shown), which are constants having a phase different therebetween, using the stator based reference d-axis virtual voltage 231, the stator reference q-axis virtual voltage 232 and the double system angle 251 (2θ$_g$).

The fifth frame converter 240 performs calculation according to Equation 6.

$$R(2\theta_g) = \begin{bmatrix} \cos2\theta_g & \sin2\theta_g \\ -\sin2\theta_g & \cos2\theta_g \end{bmatrix} \quad \text{[Equation 6]}$$

$$V_{dc\_dqs}^r = R(2\theta_g)V_{dc\_dqs}^s$$

In Equation 6, 2θ$_g$ represents the double system angle, $V_{dc\_dqs}^S$ represents the stator based d-axis virtual voltage 231 and the stator based q-axis virtual voltage 232, and $V_{dc\_dqs}^r$ denotes the synchronous reference frame based d-axis virtual voltage 241 and synchronous reference frame based q-axis virtual voltage.

The phase lock unit 250 can receive the synchronous reference frame based d-axis virtual voltage 241 from the fifth frame converter 240 and separately accept a constant value "0" (243). The phase lock unit 250 can generate the double system angle 251 (2θ$_g$), the double system frequency 252 (2ω$_{grid}$), the system angle 201 (θ$_g$), and the system frequency 202 (f$_g$ or ω$_{grid}$).

The phase lock unit 250 may include a phase lock loop (PLL). The PLL is a frequency negative feedback circuit that locks the phase of a received signal and maintains the frequency of an output signal uniform.

Figure 5B:
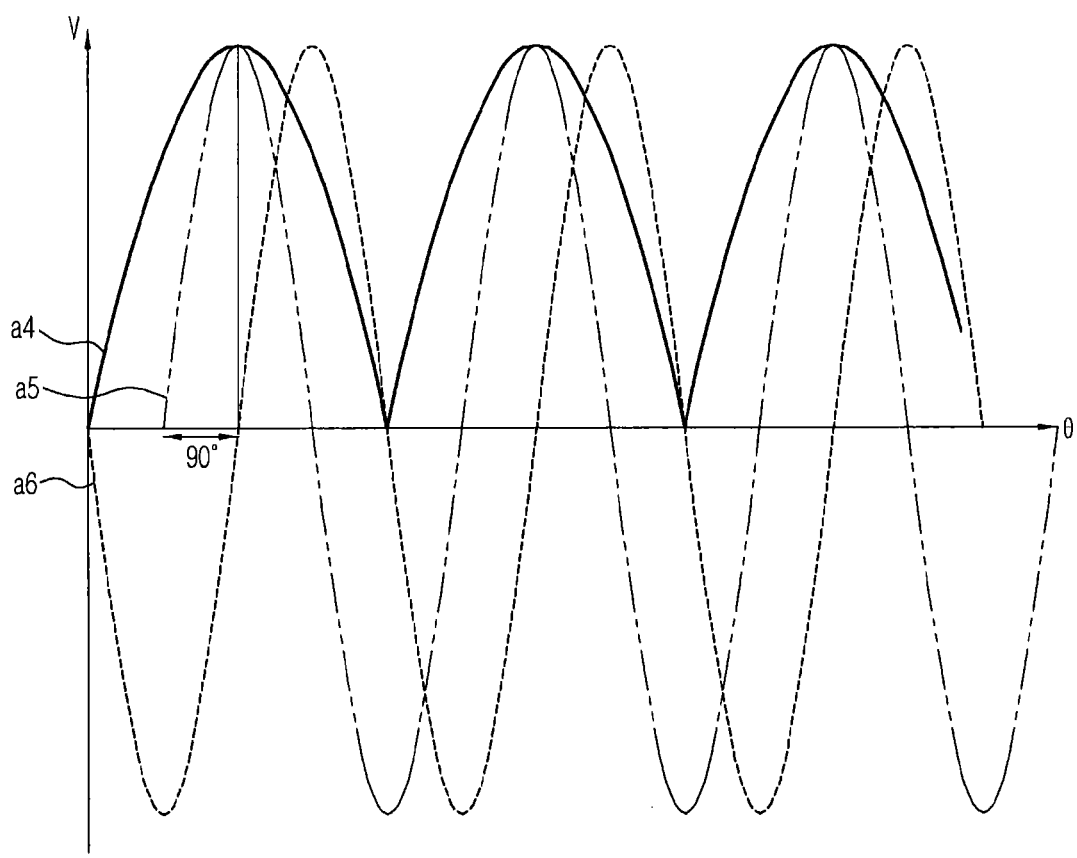
FIG. 5B illustrates an input waveform and calculated waveforms of the system angle estimator according to an embodiment of the present invention.

FIG. 5B illustrates an input waveform and calculated waveforms of the system angle estimator according to an embodiment of the present invention.

Referring to FIG. 5B, waveform a4 of the DC-link voltage 36 denoted as $V_{dc}$ is illustrated.

In addition, waveform a5 of the double system frequency component value 221 denoted as $V_{dc\_2\omega_{grid}}$ is illustrated.

FIG. 5B also illustrates waveform a6 of the 90° phase-retarded value 231 ($V_{dc\_2\omega_{grid}}(\theta-90°)$) with respect to the double system frequency component value 221.

Figure 6A:
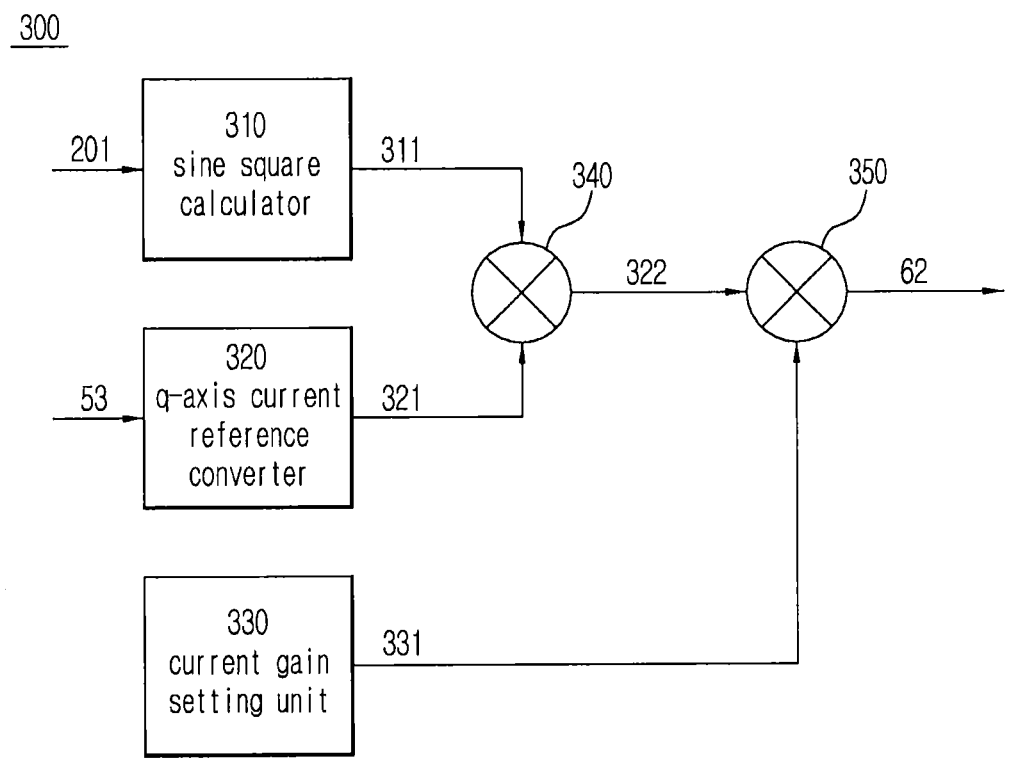
FIG. 6A illustrates a rotor based q-axis current reference generator according to an embodiment of the present invention.
Figure 6B:
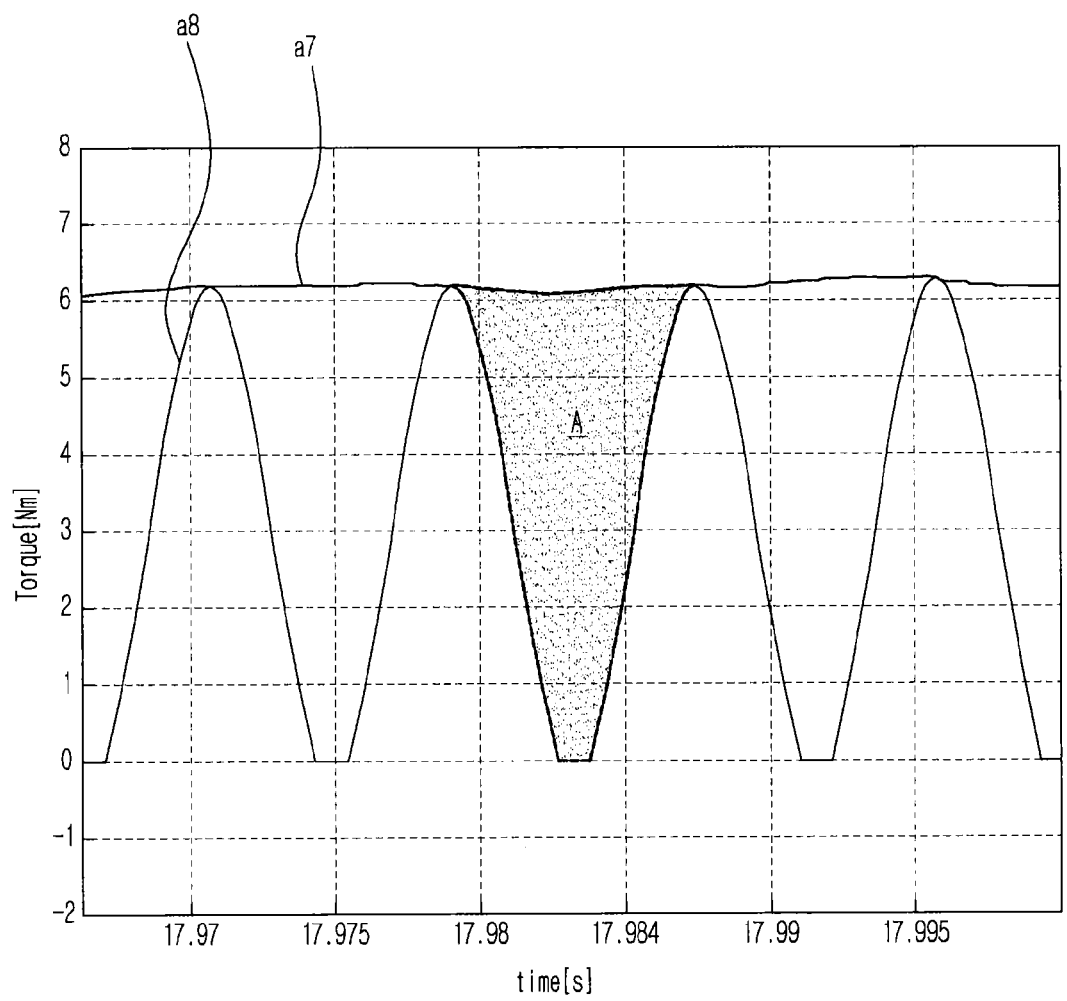
FIG. 6B illustrates waveforms of an output torque command value and a q-axis current reference in a sine squared form according to an embodiment of the present invention.

FIG. 6A illustrates a rotor based q-axis current reference generator according to an embodiment of the present invention and FIG. 6B illustrates waveforms of the output torque command value and the q-axis current reference value in a sine squared form according to an embodiment of the present invention.

The q-axis current reference generator 300 can respectively receive the output torque command value 53 and the system angle 201 from the velocity controller (not shown) and the system angle estimator (not shown) and generate the rotor based q-axis current reference 62 in a sine squared form, which is synchronized with the system angle 201.

The q-axis current reference generator 300 can generate the rotor based q-axis current reference 62 in a sine squared form having the system angle 201 of the power supply unit to control the power factor to be 1.

A q-axis current boundary value 417 refers to a threshold of the rotor based q-axis current reference 62, which makes the rotor based q-axis current value 42 correctly track the rotor-based q-axis current reference value 62. That is, the q-axis current boundary value 417 indicates the size of a maximum q-axis current available at the current operating point.

The d-axis current reference generator (not shown) can generate the rotor based d-axis current reference 61 such that the rotor based q-axis current reference 62 is generated within the range of the q-axis current boundary value 417.

Accordingly, the q-axis current reference generator 300 can determine the waveform of the rotor based reference q-axis current reference 62 having an advantage in terms of power factor and harmonics.

Referring to FIGS. 6A and 6B, the q-axis current reference generator 300 according to an embodiment of the present invention may include a sine square calculator 310, a q-axis current reference converter 320, and a current gain setting unit 330.

The sine square calculator 310 can receive the system angle 201 from the system angle estimator 200 and generate a unit sine square waveform 311 having the system angle 201.

The power factor of the power supply unit (not shown) becomes 1 when the rotor based q-axis current reference 62 has a sinusoidal wave form obtained when the input current and input voltage from the power supply unit (not shown) are in-phase.

Accordingly, to determine the best form of the rotor based q-axis current reference 62, output power $P_{inv}$ of the inverter is calculated by Equations 7 and 8.

$$P_{inv} = 1.5 \times (V_{ds}^{r*} i_{ds}^{r*} + V_{qs}^{r*} i_{qs}^{r*})$$ [Equation 7]

$$P_{inv}/1.5 = \left(R i_{ds}^{r*} + L_d \frac{d i_{ds}^{r*}}{dt} - \omega_r L_q i_{qs}^{r*}\right) i_{ds}^{r*} +$$ [Equation 8]
$$\left(R i_{qs}^{r*} + L_q \frac{d i_{qs}^{r*}}{dt} + \omega_r L_d i_{ds}^{r*} + \omega_r \lambda_{pm}\right) i_{qs}^{r*}$$

In Equations 7 and 8, $V_{ds}^{r*}$ denotes the rotor based d-axis voltage reference, $i_{ds}^{r*}$ denotes the rotor based d-axis current reference 61, $i_{qs}^{r*}$ represents the rotor based q-axis current reference 62, $V_{qs}^{r*}$ represents the rotor based q-axis voltage reference, R denotes wire wound resistance of a stator, $L_d$ denotes d-axis inductance, $L_q$ represents q-axis inductance, $\omega_r$ represents rotor angular velocity, $\lambda_{pm}$ represents magnetic flux of a rotor based q-axis stator, and $P_{inv}$ denotes output power of the inverter.

In Equations 7 and 8, when the rotor based d-axis current reference 61 is controlled to be a specific value and the rotor based q-axis current reference 62 is controlled to be $\sin^2\theta_g$ voltage $$L_q \frac{d i_{qs}^{r*}}{dt}$$

corresponding to a derivative term can be ignored.

Therefore, the q-axis current reference generator 300 can control the power factor of the power supply unit to be 1 by generating the rotor based current reference 62 in the form of $\sin^2\theta_g$.

The q-axis current reference converter 320 can receive the output torque command value 53 from the velocity controller (not shown) and generate a q-axis current reference 321 corresponding to the output torque command value 53.

A first multiplier 340 can receive the unit sine square waveform 311 from the sine square calculator 310 and accept the q-axis current reference 321 from the q-axis current reference converter 320. The first multiplier 340 can generate a q-axis current reference 322 in a sine square form using the unit sine square waveform 311 and the q-axis current reference 321.

For example, the first multiplier 340 can generate the q-axis current reference 322 in a sine square form by multiplying the unit sine square waveform 311 by the q-axis current reference 321.

The current gain setting unit 330 can generate a current gain 331 ($K_{sc}$) that makes the average of the output torque command value 53 and the average a current reference modified torque 64 ($T_{modi}^*$) generated according to the rotor based q-axis current reference 62 equal to each other.

For example, the current gain setting unit 330 can generate the current gain 331 that makes the output torque command value 53 corresponding to the output value of the velocity controller (not shown) equal to the average of torques that can be transmitted to the three-phase motor (not shown) by the inverter (not shown) that pulsates at a frequency twice the source frequency.

A second multiplier 350 can receive the q-axis current reference 322 in a sine square form from the first multiplier 340 and accept the current gain 331 from the current gain setting unit 330. The second multiplier 350 can generate the rotor based q-axis current reference 62.

For example, the second multiplier 350 can generate the rotor based q-axis current reference 62 by multiplying the q-axis current reference 322 in a sine square form by the current gain 331.

FIG. 6B illustrates waveform a7 of the output torque command value 53 and waveform a8 of a torque generated according to the q-axis current reference 322 in a sine square form.

Periodic insufficiency of torque in a steady state, as shown in region 600, can occur and the torque that is not generated periodically is accumulated in addition to velocity pulsation due to load variation, and thus the velocity of the motor (not shown) may pulsate.

Therefore, the current gain setting unit 330 according to an embodiment of the present invention can obtain the current gain 331, which makes the average of the output torque command value 53 corresponding to the output value of the velocity controller (not shown) equal to the average of the current reference modified torque 64 generated according to the rotor based q-axis current reference 62, using Equation 9.

$$T_{modi}^* = K_{sc} \times T_{sc}^* \times \sin^2\theta_g$$ [Equation 9]

$$\frac{\int_\pi}{\omega_{grid}} T_{sc}^* = \frac{\int_\pi}{\omega_{grid}} T_{modi}^*$$

$$T_{sc}^* = K_{sc} \times T_{sc}^* \frac{\int_\pi}{\omega_{grid}} \sin^2\theta_g$$

$$T_{sc}^* = \frac{K_{sc} \times T_{sc}^*}{2}$$

In Equation 9, $T_{sc}^*$ denotes the output torque command value 53 corresponding to the output value of the velocity controller (not shown), $K_{sc}$ denotes the current gain 331, $T_{modi}^*$ represents the current reference modified torque 64 generated according to the rotor based q-axis current reference 62, $\theta_g$ represents the system angle 201, and $\omega_{grid}$ represents the system frequency 202.

For example, the current gain setting unit 330 can make the average of the output torque command value 53 corresponding to the output value of the velocity controller equal to the average of the current reference modified torque 64 generated according to the rotor based q-axis current reference 62 by setting the current gain 331 to "2".

Figure 7A:
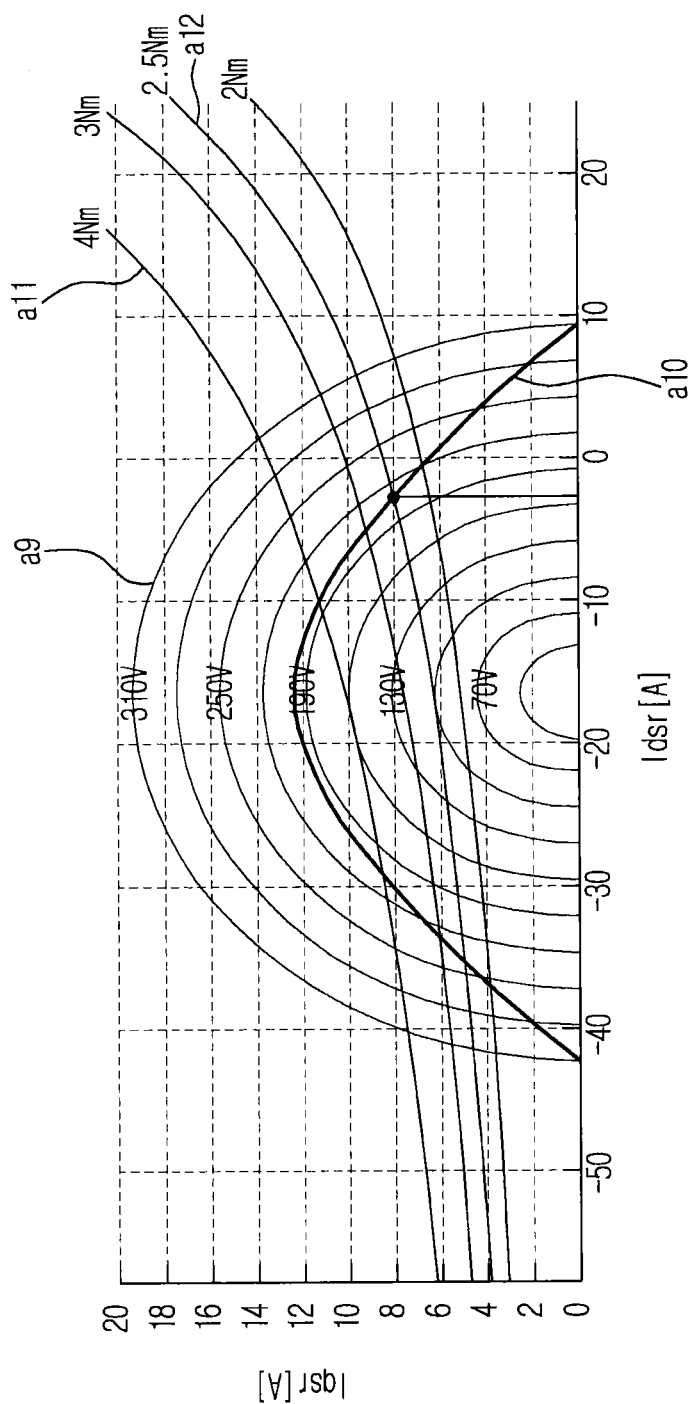
FIG. 7A illustrates an average voltage limit circle and load torque curves according to an embodiment of the present invention.
Figure 7B:
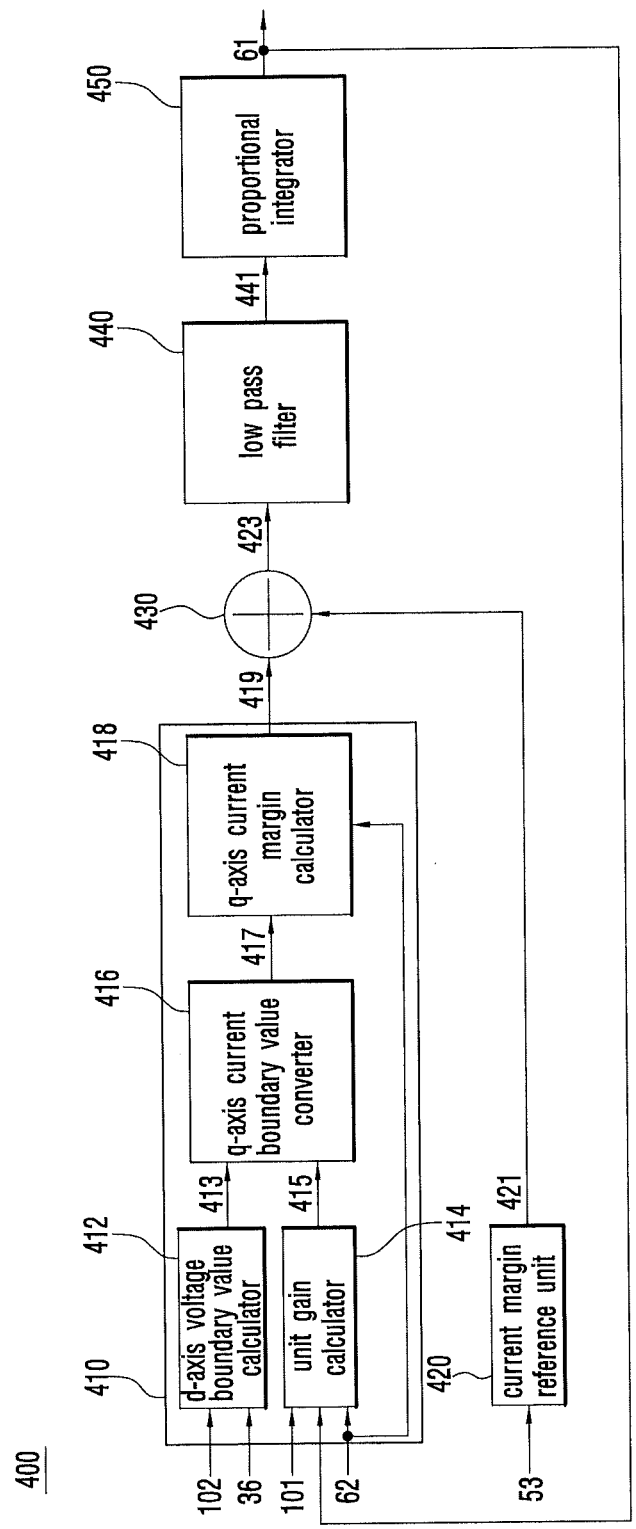
FIG. 7B illustrates a rotor based d-axis current reference generator according to an embodiment of the present invention.
Figure 7C:
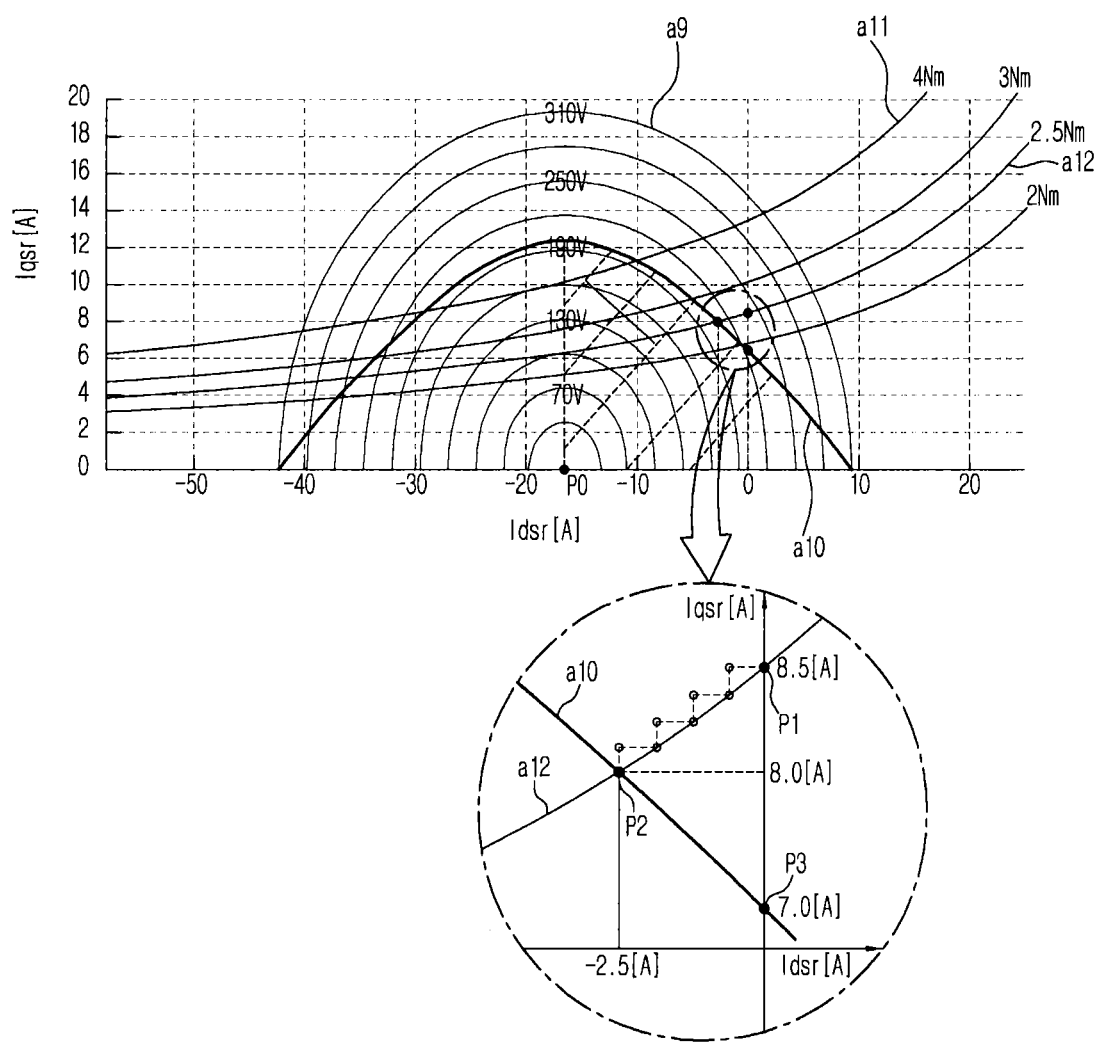
FIG. 7C illustrates a generation of a rotor based d-axis current reference and a rotor based q-axis current reference.

FIG. 7A illustrates an average voltage limit circle and load torque curves according to an embodiment of the present invention, FIG. 7B is a block diagram of the rotor based d-axis current reference generator according to an embodiment of the present invention, and FIG. 7C is a diagram illustrating generation of the rotor based d-axis current reference and the rotor based q-axis current reference.

Referring to FIG. 7A, an instantaneous voltage limit circle a9, an average voltage limit curve a10 and load torque curves a11 and a12 are shown on a d-axis and q-axis current plane.

For example, the load torque curves a11 and a12 include a motor generation torque curve.

In a motor driving system having a large-capacitance capacitor, the instantaneous voltage limit circle a9 is changed only by the motor velocity because variation in the DC-link voltage 36 can be ignored. However, when a small-capacitance capacitor is used for the DC link (not shown), the DC-link voltage 36 varies to the double system frequency 202 even at a fixed velocity. Accordingly, a new "average voltage limit circle a10" may be defined.

The instantaneous voltage limit circle a9 is a representation of a voltage limit value, which changes periodically at a specific motor velocity, on the d-axis and q-axis current plane.

The average voltage limit curve a10 is a representation of the average of the voltage limit value, which changes periodically at the specific motor velocity, for a half cycle of the source frequency on the d-axis and q-axis current plane.

The average voltage limit curve a10 can be obtained by Equations 10 and 11.

$$V_{dc} = \|V_{dc}\| \sin(\theta_g) \quad \text{Equation 10}$$

In Equation 10, $\|V_{dc}\|$ denotes a maximum value of the DC-link voltage 36 and $\theta_g$ denotes the system angle 201.

$$i_{qs}^r = \frac{1}{\omega_r L_q} \sqrt{\frac{V_{dc}^2}{3} - \{\omega_r(\lambda_{pm} + L_q i_{ds}^r)\}^2} \quad \text{[Equation 11]}$$

In Equation 11, $i_{qs}^r$ denotes the rotor based q-axis current, $L_d$ denotes d-axis inductance, $L_q$ denotes q-axis inductance, $\omega_r$ represents the rotor angular velocity, $\lambda_{pm}$ represents magnetic flux of the rotor based q-axis stator, $i_{ds}^r$ represents the rotor based d-axis current, and $V_{dc}^2$ represents the DC-link voltage square.

The rotor based q-axis current that can be obtained within the range of the instantaneous voltage limit value can be calculated by Equations 10 and 11. The average of the rotor based q-axis current that can flow for one cycle can be obtained by averaging the rotor based q-axis current for one cycle.

The average voltage limit curve a10 is obtained by calculating the average of the rotor based q-axis current while changing the rotor based d-axis current and representing the average on the current plane.

However, it may be necessary to consider motor parameters when the average voltage limit curve is generated according to Equation 11.

Accordingly, an exemplary embodiment of the present invention can use a rotor based d-axis voltage boundary value 413 to obtain the correct average voltage limit curve without considering the motor parameters, which will be described in detail below through Equation 12.

Referring to FIG. 7A, the instantaneous voltage limit circle a9 and the average voltage limit curve a10 are shown on the d-axis and q-axis current plane.

For example, to control a motor torque to be 2.5 [Nm], the rotor based d-axis current reference 61 at which the average voltage limit curve a10 meets a motor generated torque curve a12 needs to be maintained at approximately −2.5 [A] and the rotor based q-axis current reference 62 needs to be maintained at approximately 8 [A].

Referring to FIG. 7B, the d-axis current reference generator 400 may include a current margin calculator 410, a current margin reference unit 420, a first adder 430, a low pass filter 440 and a proportional integrator 450.

The current margin calculator 410 can generate a rotor based q-axis current margin value 419. The current margin calculator 410 may include a d-axis voltage boundary value calculator 412, a unit gain calculator 414, a q-axis current boundary value converter 416 and a q-axis current margin calculator 418.

The d-axis voltage boundary value calculator 412 can receive the rotor based q-axis voltage limit value 102 from the third frame converter (not shown) and accept the DC-link voltage 36 from the voltage sensor (not shown). The d-axis voltage boundary value calculator 412 can generate the rotor based d-axis voltage boundary value 413.

The d-axis voltage boundary value calculator 412 performs computation according to Equation 12. Here, Equation 12 is a modification of Equation 11 and corresponds to an equation with respect to voltage.

That is, Equation 12 is obtained by modifying Equation 11 into an equation with respect to voltage.

$$V_{ds}^{r*}\_boundary = \left(\sqrt{\frac{V_{dc}^2}{3} - (V_{qs-sat}^{r*})^2}\right) \quad \text{[Equation 12]}$$

In Equation 12, $V_{dc}^2$ denotes the DC-link voltage square 211, $V_{qs-sat}^{r*}$ denotes the rotor based q-axis voltage limit value 102, and $V_{ds}^{r*}\_boundary$ represents the rotor based d-axis voltage boundary value 413.

The rotor based d-axis voltage boundary value 413 refers to a maximum instantaneous voltage that can be applied to a d axis when the periodically varying DC-link voltage 36 and the rotor based q-axis voltage limit value 102 are taken into account.

Equation 12 uses feedback of the rotor based q-axis voltage limit value $V_{qs-sat}^{r*}$.

Since a counter electromotive force component $\omega_r(\lambda_{pm} + L_d i_{ds}^r)$ appearing at rotor based q-axis and transient voltage $$L_q \frac{di_{qs}^r}{dt}$$

before sampling before a current reference is generated are reflected in the rotor based q-axis voltage limit value, Equation 12 is preciser than Equation 11 and has an advantage of requiring no motor parameters.

The unit gain calculator 414 can receive the rotor based d-axis voltage limit value 101 from the third frame converter (not shown), receive the rotor based d-axis current reference 61 from the proportional integrator 450 and accept the rotor based q-axis current reference 62 from the q-axis current reference generator (not shown). The unit gain calculator 414 can generate a unit gain 415 ($=K_z=\omega_r L_q$).

For example, since the q-axis inductance $L_q$ largely varies according to load condition, the unit gain 415 can be obtained using a d-axis voltage equation (Equation 13) to design a controller robust to parameter error.

$$V_{ds}^r = R_s i_{ds}^r + L_d \frac{d}{dt} i_{ds}^r - \omega_r L_q i_{qs}^r \quad \text{[Equation 13]}$$

In Equation 13, $V_{ds}^r$ denotes a rotor based d-axis voltage, $R_s$ denotes wire wound resistance of the stator, $i_{ds}^r$ denotes a rotor based d-axis current, $L_d$ represents d-axis inductance, $\omega_r$ represents the rotor angular velocity, and $L_q$ represents q-axis inductance.

The q-axis current boundary value converter 416 can receive the rotor based d-axis voltage boundary value 413 from the d-axis voltage boundary value calculator 412 and accept the unit gain 415 from the unit gain calculator 414.

The q-axis current boundary value converter 416 can generate a rotor based q-axis boundary value 417 ($i_{qs}^{r*}$-Boundary).

The rotor based q-axis current boundary value 417 refers to a maximum rotor based q-axis current that can be obtained at the current operating point (velocity and load conditions).

The rotor based q-axis current boundary value 417 may be obtained on the basis of the rotor based d-axis voltage boundary value 413 and the unit gain 415.

When the rotor based q-axis current boundary value 417 is input to a low pass filter (not shown) located between the q-axis current boundary value converter 416 and the q-axis current margin calculator 418, the low pass filter outputs the average of the rotor based q-axis current boundary value 417.

The average of the rotor based q-axis current boundary value 417 refers to a value obtained by averaging the rotor based q-axis current boundary value 417 for one cycle of the DC-link voltage.

While FIG. 7B illustrates that the rotor based q-axis current boundary value 417 is input to the q-axis current margin calculator 418 from the q-axis current boundary value converter 416, the average of the rotor based q-axis current boundary value 417 is applied to the q-axis current margin calculator 418.

Therefore, an exemplary embodiment of the present invention can obtain the average of the rotor based q-axis current boundary value 417 using Equation 12.

The average voltage limit curve a10 is obtained by calculating the average of the rotor based q-axis current boundary value 417 while changing the rotor-based d-axis current and representing the average of the rotor based q-axis current boundary value 417 on the current plane.

The average of the rotor based q-axis current boundary value 417 may be used to generate the rotor based d-axis current reference value 61.

The q-axis current margin calculator 418 can receive the average of the rotor based q-axis current boundary value 417 from the q-axis current boundary value converter 416 and accept the rotor based q-axis current reference 62 from the q-axis current reference generator 300. The q-axis current margin calculator 418 can generate a rotor based q-axis current margin value 419.

The rotor based q-axis current margin value 419 may be obtained using a difference between the average of the rotor based q-axis current boundary value 417 and the rotor based q-axis current reference 62.

For example, the rotor based q-axis current margin value 419 corresponds to a value obtained by subtracting the rotor based q-axis current reference 62 from the average of the rotor based q-axis current boundary value 417.

The current margin reference unit 420 can receive the output torque command value 53 from the velocity controller (not shown) and generate a rotor based q-axis current margin reference 421.

The output torque command value 53 may refer to a value obtained by subtracting an anti-wind up value corresponding to a torque generated according to current limitation from the actually necessary torque.

Accordingly, the current margin reference unit 420 can increase the rotor based-q-axis current margin reference 421 in a positive direction to compensate for insufficient torque (anti-wind up) due to current limitation.

For example, the current margin reference unit 420 can generate the rotor based q-axis current margin reference 421 by dividing the anti-wind up value $T_{e-anti}$ of torque output by $k_T$.

When anti-windup of the torque is generated due to current limitation (e.g., generated torque is insufficient), the d-axis current reference generator 400 can increase rotor based q-axis current density within current limitation by increasing the rotor based d-axis current reference 61 in a negative direction.

For example, if the rotor based q-axis current reference 62 that needs to be generated is greater than the average of the rotor based q-axis current boundary value 417, the current margin reference unit 420 increases the rotor based q-axis current margin reference 421 in a positive direction.

As a result, the rotor based d-axis current reference 61 increases in the negative direction and the average of the rotor based q-axis current boundary value 417 corresponding to the increased rotor based d-axis current reference 61 also increases.

The rotor based q-axis current reference value 62 corresponding to the increased rotor based d-axis current reference 61 decreases.

On the contrary, in a steady state or when current is not limited, the current margin reference unit 420 can set the rotor based q-axis current margin reference 421 to a value of "0".

The rotor based d-axis current 61 is determined such that the average of the rotor based q-axis current boundary value 417 equals the rotor based q-axis current reference 62.

Accordingly, the d-axis current reference generator 400 can generate the best rotor based d-axis current reference 61 for the rotor based q-axis current reference 62 in any form.

When the generated torque is insufficient due to current limitation, the d-axis current reference generator 400 can generate the rotor based q-axis current reference 62 within the range of the q-axis current boundary value by increasing the rotor based d-axis current reference 61 in the negative direction.

Conversely, in a steady state or when current is not limited, the d-axis current reference generator 400 sets the q-axis current margin reference 421 to "0". The d-axis current may be determined as a best value in a steady state regardless of the rotor based q-axis current reference 62.

The first adder 430 can receive the rotor based q-axis current margin value 419 and the rotor based q-axis current margin reference 421 and generate an error value 423 by subtracting the rotor based q-axis current margin reference 421 from the rotor based q-axis current margin value 419.

The low pass filter 440 can obtain the average of the error value 423. While FIG. 7B illustrates only one low pass filter 440, the low pass filter can be located to obtain each of the averages of the rotor based q-axis current reference 62, the rotor based q-axis current boundary value 417 and the rotor based q-axis current margin reference value 421.

The proportional integrator 450 can receive the average of the error value 423 from the first adder 430 and generate the rotor based d-axis current reference 61.

When the current is limited, the current margin reference unit 420 increases the rotor based q-axis current margin reference value 421 to a positive value. As a result, the average of the error value 423 gradually increases, the rotor based d-axis current reference 61 increases in the negative direction, and the average of the rotor based q-axis current boundary value 417 corresponding to the increased rotor based d-axis current reference 61 also increases.

The rotor based q-axis current reference 62 corresponding to the increased rotor based d-axis current reference 61 decreases.

Referring to FIG. 7C, the rotor based d-axis current reference and the rotor based q-axis current reference can be generated in a dashed area.

That is, the rotor based d-axis current reference can be generated in the range of 0 to P0 (e.g., $$\left[0 \sim -\frac{\lambda_{pm}}{L_d}\right]).$$

The velocity controller (not shown) generates the output torque command value 53 such that the steady state can be maintained.

The current reference generator (not shown) can generate an instruction corresponding to point P1 (at which the rotor based q-axis current reference=8.5 [A] and the rotor based d-axis current reference=0 [A]) to generate a load torque curve a12 of 2.5 [Nm].

However, the rotor based q-axis current cannot be 8.5 [A] when the voltage corresponding to an instantaneous voltage limit circle (a curve located in the range of 220 [V] to 250 [V] of a9) is applied.

This is because the rotor based q-axis current that can be actually generated is 7.0 [A] although the rotor based q-axis current reference is 8.5 [A].

In this case, the generated torque becomes lower than a load torque so as to decrease the motor velocity.

To compensate for the motor velocity decrease, the current margin reference unit 420 can generate the rotor based q-axis current margin reference value 421.

For example, the current margin reference unit 420 can generate the rotor based q-axis current margin reference value 421 of 1.0 [A] to increase the generated torque (to generate 9.5 [A] greater than 8.5 [A]).

Generation of the rotor based q-axis current margin reference value 421 by the current margin reference unit 420 can be regarded as confirmation of a current margin for the torque. That is, the average of the rotor based q-axis current boundary value needs to increase by 1 [A].

The current margin calculator 410 checks an instantaneous state in which the DC-link voltage pulsates.

When the rotor based d-axis current reference 61 is 0 [A], the rotor based q-axis current boundary value 417 can continuously vary in the range of 0 to 15 [A] according to a pulsating voltage.

The average of the rotor based q-axis current boundary value 417 has a value of 7.0 [A] (P3). This value represents the threshold of the rotor based q-axis current that can be actually generated.

Accordingly, even if the q-axis current reference generator 300 generates the rotor based q-axis current reference 62 corresponding to 8.5 [A], the actually generated rotor-based q-axis current is merely 7.0 [A] (P3).

The q-axis current margin calculator 418 generates −1.5 [A] corresponding to the difference between the average of the rotor based q-axis current boundary value 417, 7.0 [A], and the rotor based q-axis current reference, 8.5 [A]. That is, the rotor based q-axis current margin value 419 is −1.5 [A].

When an error value between the rotor based q-axis current margin reference 421 and the rotor based q-axis current margin value 419 passes through the low pass filter 440 and the proportional integrator 450, the rotor based d-axis current reference corresponding to a negative value is generated.

By repeating this procedure, the rotor based current reference 62 converges on point P2 from point P1 and the average of the rotor based q-axis current boundary value 417 converges on P2 from P3.

That is, the rotor based q-axis current reference 62 gradually decreases to converge on P2 because the rotor based d-axis current reference 61 makes up for the insufficient torque.

Figure 8:
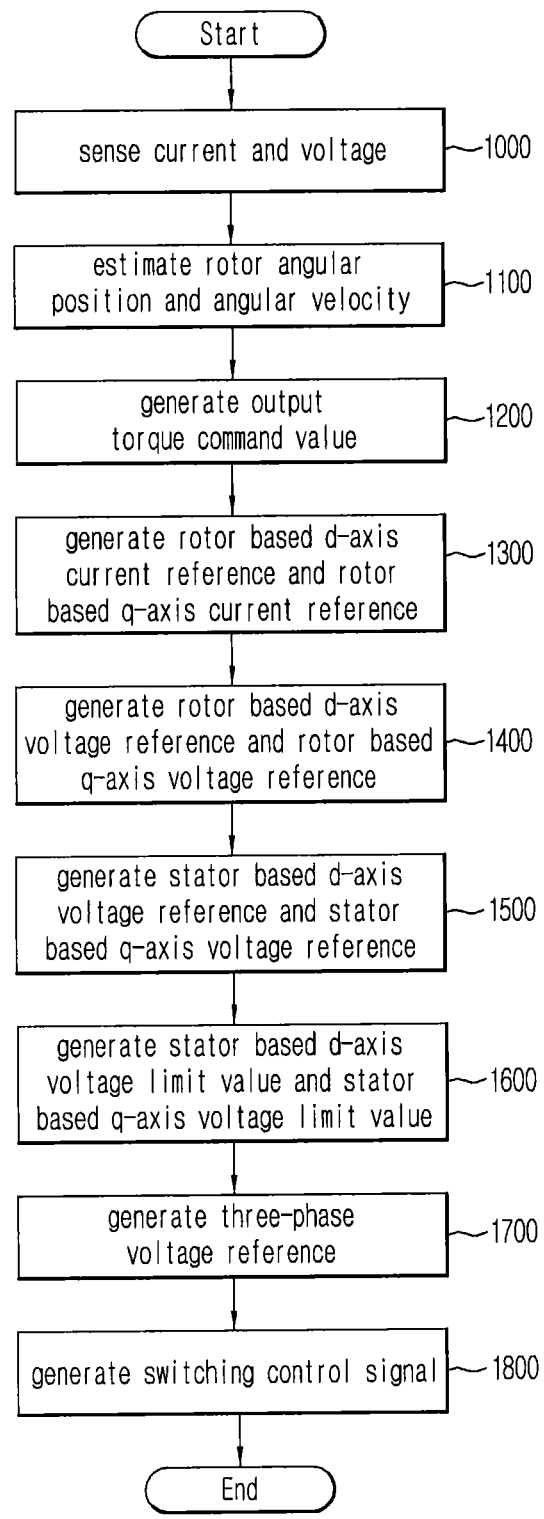
FIG. 8 illustrates a method to control an inverter control apparatus according to an embodiment of the present invention.

FIG. 8 is a flowchart illustrating a method to control an inverter control apparatus according to an embodiment of the present invention.

In the method to control the inverter control apparatus 1 that drives a three-phase motor and controls an inverter having a DC-link voltage that pulsates at a frequency twice a system frequency according to an embodiment of the present invention, the inverter control apparatus 1 includes a current sensor, a voltage sensor and a controller. In the inverter control apparatus 1, the controller receives an inverter output current value from the current sensor and accepts an inverter DC-link voltage value from the voltage sensor to estimate a system angle or a system frequency. The controller generates a rotor based q-axis current reference in a sine squared form, which is synchronized with the system angle, averages a periodically varying voltage limit value for a half cycle of the system frequency to generate the average rotor based q-axis current value, and generates a rotor based d-axis current reference on the basis of the average rotor based q-axis current value.

The inverter control apparatus 1 may receive an output phase current sense signal of the inverter 5, which is an analog signal, from the current sensor 6 and receives a voltage sense signal of the DL link 4, which is an analog signal, from the voltage sensor 7 (1000).

The inverter control apparatus 1 can estimate the position of a rotor without using a position sensor. That is, the inverter control apparatus 1 can generate the rotor angular position estimate 11 ($\theta_r$). The inverter control apparatus 1 can generate the rotor angular velocity estimate 21 ($\omega_r$) by differentiating the rotor angular position estimate 11 (1100).

The inverter control apparatus 1 can receive the output phase current sense signal of the inverter 5, which is an analog signal, from the current sensor 6 and generate the three-phase motor input phase current values 32, 33 and 34 corresponding to digital signals.

The inverter control apparatus 1 can receive the voltage sense signal of the DC link 4, which corresponds to an analog signal, from the voltage sensor 7 and generate a DC-link voltage 36 corresponding to a digital signal.

The inverter control apparatus 1 frame-converts the three-phase motor input phase current values 32, 33 and 34 to rotor based two-phase current 41 and 42.

The first frame converter 40 receives the three-phase motor input phase current values 32, 33 and 34 from the current sensor 6 and receives the rotor angular position estimate 11 from the rotor angular position estimator 10.

The inverter control apparatus 1 can generate the rotor based d-axis current value 41 and the rotor based q-axis current value 42, which are constants having a phase difference of 90° therebetween using the three-phase motor input phase current values 32, 33 and 34 and the rotor angular position estimate 11.

The inverter control apparatus 1 can generate the output torque command value 53 using the rotor angular velocity reference 51 and the rotor angular velocity estimate 21 (1200).

The inverter control apparatus 1 can generate the rotor based d-axis current reference 61 and the rotor based q-axis current reference 62 using the output torque command value 53, the rotor based d-axis voltage limit value 101, the rotor based q-axis voltage limit value 102 and the DC-link voltage 36 (1300).

Generation of the rotor based d-axis current reference 61 and the rotor based q-axis current reference 62 by the inverter control apparatus 1 has been described with reference to FIG. 4.

The inverter control apparatus 1 can generate the rotor based d-axis voltage reference 71 and the rotor based q-axis voltage reference 72 using the rotor based d-axis current reference 61, the rotor based q-axis current reference 62, the rotor based d-axis current value 41 and the rotor based q-axis current value 42 (1400).

The inverter control apparatus 1 can generate the stator based d-axis voltage reference 81 and the stator based q-axis voltage reference 82, which are AC values having a phase difference of 90° therebetween, using the rotor based d-axis voltage reference 71, the rotor based q-axis voltage reference 72 and the rotor angular position estimate 11 (1500).

The inverter control apparatus 1 can generate the stator based d-axis voltage limit value 91 and a stator based q-axis voltage limit value 92 using the stator based d-axis voltage reference 81, the stator based q-axis voltage reference 82 and the DC-link voltage 36 (1600).

The inverter control apparatus 1 can generate the rotor based d-axis voltage limit value 101 and the rotor based q-axis voltage limit value 102, which have a phase difference of 90° therebetween, using the stator based d-axis voltage limit value 91, the stator based q-axis voltage limit value 92 and the rotor angular position estimate 11.

The inverter control apparatus 1 can generate the three-phase voltage references 111, 112 and 113 which are three-phase AC values using the stator based d-axis voltage limit value 91 and the stator based q-axis voltage limit value 92 (1700).

The inverter control apparatus 1 can generate the switching control signals 121 to 126 of the 6 switches (not shown) of the inverter (not shown) using the three-phase voltage references 111, 112 and 113 and rotor angular position estimate 11 (1800).

Figure 9:
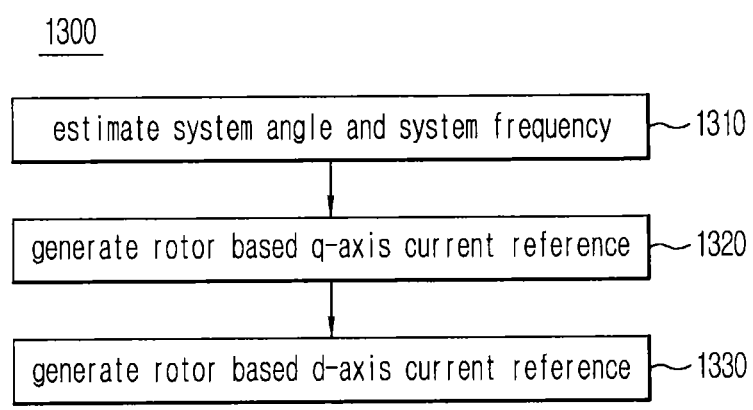
FIG. 9 illustrates a method to generate rotor based d-axis and q-axis current references according to an embodiment of the present invention.

FIG. 9 illustrates a method to generate rotor based d-axis and q-axis current references according to an embodiment of the present invention.

The inverter control apparatus 1 according to an embodiment of the present invention can take an error in motor parameters of the motor voltage equation into account even if the inverter control apparatus 1 is not aware of the motor parameters and provide a high-reliability control method through system angle estimation.

Referring to FIG. 9, the inverter control apparatus 1 can generate the system angle 201, the system frequency 202, the double system angle 251 and the double system frequency 252 using the DC-link voltage 36 (1310).

The inverter control apparatus 1 can generate the rotor based q-axis current reference 62 in a sine squared form, which is synchronized with the system angle, using the output torque command value 53 and the system angle 201 (1320).

The inverter control apparatus 1 can generate the rotor based d-axis current reference 61 using the output torque command value 53, the DC-link voltage 36, the rotor based q-axis current reference 62, the rotor based d-axis voltage limit value 101, the rotor based q-axis voltage limit value 102, and the rotor based d-axis current reference 61 received through feedback (1330).

Figure 10:
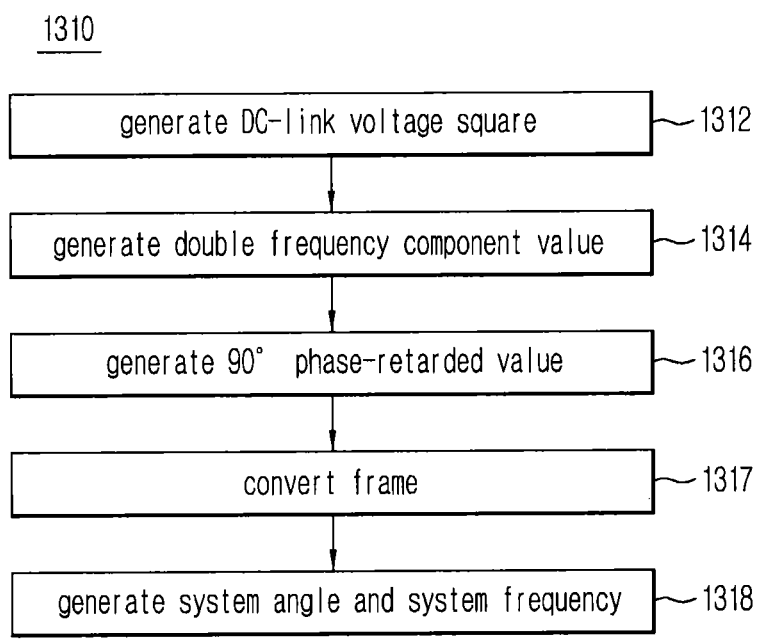
FIG. 10 illustrates a method to estimate a system angle according to an embodiment of the present invention.

FIG. 10 illustrates a method to estimate a system angle according to an embodiment of the present invention.

The inverter control apparatus 1 can generate the DC-link voltage square 211 using the DC-link voltage 36 (1312).

The DC-link voltage square 211 is obtained by squaring the DC-link voltage 36.

The inverter control apparatus 1 can generate the double system frequency component value 221 ($V_{dc\_2\omega_{grid}}$) of the DC-link voltage square 211 using the DC-link voltage square 211 and the double system frequency 252 ($2\omega_{grid}$) (1314).

For example, the inverter control apparatus 1 can set the frequency twice the system frequency (50 Hz or 60 Hz) to an initial value, and use the double system frequency 252 ($2\omega_{grid}$) by feeding back the same in cases other than a case in which the motor is driven.

The inverter control apparatus 1 can perform calculations according to Equation 3.

$$V_{dc\_2\omega_{grid}} = BPF(V_{dc}^2, 2\omega_{grid}) \quad \text{Equation 3}$$

In Equation 3, $V_{dc}^2$ denotes the DC-link voltage square, $\omega_{grid}$ denotes the system frequency, and $V_{dc\_2\omega_{grid}}$ represents the double system frequency component value 221 of the DC-link voltage square 211.

The inverter control apparatus 1 can generate the 90° phase-retarded value 231 ($V_{dc\_2\omega_{grid}}(\theta-90°)$) having a phase retarded by 90° from the double system frequency component value 221 using the double system frequency component value 221 of the DC-link voltage square 211 (1316).

The inverter control apparatus 1 can perform calculations according to Equation 4.

$$V_{dc\_2\omega_{grid}}(\theta-90°) = SOGI(V_{dc\_2\omega_{grid}})$$

$$\text{or } V_{dc\_2\omega_{grid}}(\theta-90°) = APF(V_{dc\_2\omega_{grid}}) \quad \text{Equation 4}$$

In Equation 4, $V_{dc\_2\omega_{grid}}$ denotes the double system frequency component value 221 of the DC-link voltage square 211, SOGI (Second Order General Integrator) denotes a secondary general integrator, APF represents an all-pass filter, and $V_{dc\_2\omega_{grid}}(\theta-90°)$ represents the 90° phase-retarded value 231.

For example, the inverter control apparatus 1 can include an all-pass filter or a secondary general integrator.

The inverter control apparatus 1 can perform frame conversion (1317).

That is, the inverter control apparatus 1 can generate the synchronous reference frame based d-axis virtual voltage 241 and the synchronous reference frame based q-axis virtual voltage (not shown), which are constants having a phase difference therebetween, using the stator based d-axis virtual voltage 231, the stator based q-axis virtual voltage 232, and the double system angle 251.

The stator based d-axis virtual voltage 231 ($V_{dc\_ds}^S$) and the stator based q-axis virtual voltage 232 ($V_{dc\_qs}^S$) can be defined by Equation 5.

$$V_{dc\_ds}^S = V_{dc\_2\omega_{grid}}(\theta-90°)$$

$$V_{dc\_qs}^S = -V_{dc\_2\omega_{grid}} \quad \text{Equation 5}$$

In Equation 5, $V_{dc\_ds}^S$ denotes the stator based d-axis virtual voltage 231 and $V_{dc\_2\omega_{grid}}(\theta-90°)$ denotes the 90° phase-retarded value 231. The stator based d-axis virtual voltage 231 and the 90° phase-retarded value 231 use the same reference numeral for convenience. $V_{dc\_qs}^S$ represents the stator based q-axis virtual voltage 232 and $V_{dc\_2\omega_{grid}}$ represents the double system frequency component value 221 of the DC-link voltage square 211.

The stator based q-axis virtual voltage 232 corresponds to a value obtained by multiplying the double system frequency component value 221 of the DC-link voltage square 211 by "1".

The inverter control apparatus 1 can generate the synchronous reference frame based d-axis virtual voltage 241 and the synchronous reference frame based q-axis virtual voltage (not shown), which are constants having a phase difference therebetween, using the stator based d-axis virtual voltage 231, the stator based q-axis virtual voltage 232, and the double system angle 251 ($2\theta_g$).

The inverter control apparatus 1 performs calculation according to Equation 6.

$$R(2\theta_g) = \begin{bmatrix} \cos2\theta_g & \sin2\theta_g \\ -\sin2\theta_g & \cos2\theta_g \end{bmatrix}$$ [Equation 6]

$$V^r_{dc\_dqs} = R(2\theta_g) V^s_{dc\_dqs}$$

In Equation 6, $2\theta_g$ represents the double system angle, $V^s_{dc\_dqs}$ represents the stator based d-axis virtual voltage 231 and the stator based q-axis virtual voltage 232, and $V^r_{dc\_dqs}$ denotes the synchronous reference frame based d-axis virtual voltage 241 and synchronous reference frame based q-axis virtual voltage 242.

The inverter control apparatus 1 can generate the double system angle 251 ($2\theta_g$), the double system frequency 252 ($2\omega_{grid}$), the system angle 201 ($\theta_g$), and the system frequency 202 ($f_g$ or $\omega_{grid}$) using the synchronous reference frame based d-axis virtual voltage 241 and the constant "0" (243) (1318).

The inverter control apparatus 1 may include a phase lock loop (PLL). The PLL is a frequency negative feedback circuit that locks the phase of a received signal and maintains the frequency of an output signal uniform.

Figure 11:
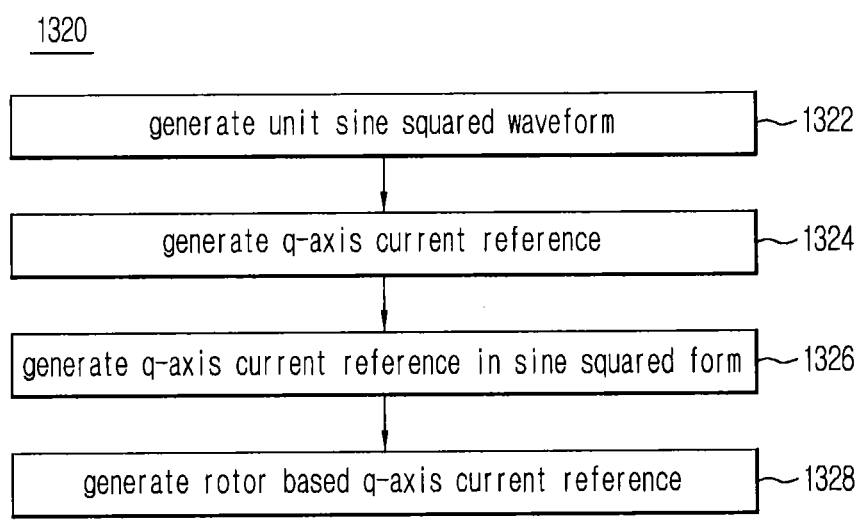
FIG. 11 illustrates a method to generate a q-axis current reference according to an embodiment of the present invention.

FIG. 11 illustrates a method to generate a q-axis current reference according to an embodiment of the present invention.

The inverter control apparatus 1 can generate the rotor based q-axis current reference 62 in a sine squared form having the system angle 201 of the power supply unit to control the power factor to be 1.

A q-axis current boundary value refers to a threshold of the rotor based q-axis current reference 62, which makes the rotor based q-axis current value correctly track the rotor-based q-axis current reference value.

The inverter control apparatus 1 can generate the rotor based d-axis current reference such that the rotor based q-axis current reference 62 is generated within the range of the q-axis current boundary value 417.

Accordingly, the inverter control apparatus 1 can determine the waveform of the rotor based reference q-axis current reference 62 having an advantage in terms of power factor and harmonics.

The inverter control apparatus 1 can generate the unit sine square waveform 311 having the system angle 201 using the system angle 201.

The power factor of the power supply unit (not shown) becomes 1 when the rotor based q-axis current reference 62 has a sinusoidal wave form obtained when the input current and input voltage from the power supply unit (not shown) are in-phase.

Accordingly, to determine the best form of the rotor based q-axis current reference 62, output power $P_{inv}$ of the inverter is calculated by Equations 7 and 8.

$$P_{inv} = 1.5 \times (V^{r*}_{ds} i^{r*}_{ds} + V^{r*}_{qs} i^{r*}_{qs})$$ [Equation 7]

$$P_{inv}/1.5 = \left( R i^{r*}_{ds} + L_d \frac{d i^{r*}_{ds}}{dt} - \omega_r L_q i^{r*}_{qs} \right) i^{r*}_{ds} +$$ [Equation 8]

$$\left( R i^{r*}_{qs} + L_q \frac{d i^{r*}_{qs}}{dt} + \omega_r L_d i^{r*}_{ds} + \omega_r \lambda_{pm} \right) i^{r*}_{qs},$$

In Equations 7 and 8, $V^{r*}_{ds}$ denotes the rotor based d-axis voltage reference, denotes the rotor based d-axis current reference 61, $i^{r*}_{qs}$ represents the rotor based q-axis current reference 62, $V^{r*}_{qs}$ represents the rotor based q-axis voltage reference, R denotes wire wound resistance of a stator, $L_d$ denotes d-axis inductance, $L_q$ represents q-axis inductance, $\omega_r$ represents rotor angular velocity, $\lambda_{pm}$ represents magnetic flux of a rotor based q-axis stator, and $P_{inv}$ denotes output power of the inverter.

In Equations 7 and 8, when the rotor based d-axis current reference 61 is controlled to be a specific value and the rotor based q-axis current reference 62 is controlled to be $\sin^2\theta_g$, voltage $$L_q \frac{d i^{r*}_{qs}}{dt}$$

corresponding to a derivative term can be ignored.

Therefore, the inverter control apparatus 1 can control the power factor of the power supply unit to be 1 by generating the rotor based current reference 62 in the form of $\sin^2\theta_g$ (1322).

The inverter control apparatus 1 can generate the q-axis current reference 321 corresponding to the output torque command value 53 using the output torque command value 53 (1324).

The inverter control apparatus 1 can generate the q-axis current reference 322 in a sine square form using the unit sine square waveform 311 and the q-axis current reference 321.

For example, the inverter control apparatus 1 can generate the q-axis current reference 322 in a sine square form by multiplying the unit sine square waveform 311 by the q-axis current reference 321 (1326).

The inverter control apparatus 1 can generate the current gain 331 ($K_{sc}$) that makes the average of the output torque command value 53 and the average a current reference modified torque 64 ($T_{modi}^*$) generated according to the rotor based q-axis current reference 62 equal to each other.

For example, the inverter control apparatus 1 can generate the current gain 331 that makes the output torque command value 53 equal to the average of torques that can be transmitted to the three-phase motor (not shown) by the inverter (not shown) that pulsates at a frequency twice the source frequency.

The inverter control apparatus 1 can generate the rotor based q-axis current reference 62 using the q-axis current reference 322 and the current gain 331.

For example, the inverter control apparatus 1 can generate the rotor based q-axis current reference 62 by multiplying the q-axis current reference 322 in a sine square form by the current gain 331 (1328).

FIG. 6B illustrates a waveform a7 of the output torque command value 53 and waveform a8 of a torque generated according to the q-axis current reference 322 in a sine square form.

In this case, periodic insufficiency of torque in a steady state, as illustrated in region A, can occur and the torque that is not generated periodically is accumulated in addition to velocity pulsation due to load variation, and thus the velocity of the motor (not shown) may pulsate.

Therefore, the inverter control apparatus 1 according to an embodiment of the present invention can obtain the current gain 331, which makes the average of the output torque command value 53 equal to the average of the current reference modified torque 64 generated according to the rotor based q-axis current reference 62, using Equation 9.

$$T^*_{modi} = K_{sc} \times T^*_{sc} \times \sin^2\theta_g$$ [Equation 9]

$$\frac{\int_\pi}{\omega_{grid}} T^*_{sc} = \frac{\int_\pi}{\omega_{grid}} T^*_{modi}$$

$$T^*_{sc} = K_{sc} \times T^*_{sc} \frac{\int_\pi}{\omega_{grid}} \sin^2\theta_g$$

$$T^*_{sc} = \frac{K_{sc} \times T^*_{sc}}{2}$$

In Equation 9, $T_{sc}^*$ denotes the output torque command value 53, $K_{sc}$ denotes the current gain 331, $T_{modi}^*$ represents the current reference modified torque 64 generated according to the rotor based q-axis current reference 62, $\theta_g$ represents the system angle 201, and $\omega_{grid}$ represents the system frequency 202.

For example, the inverter control apparatus 1 can make the average of the output torque command value 53 corresponding to the output value of the velocity controller equal to the average of the current reference modified torque 64 generated according to the rotor based q-axis current reference 62 by setting the current gain 331 to "2".

Figure 12:
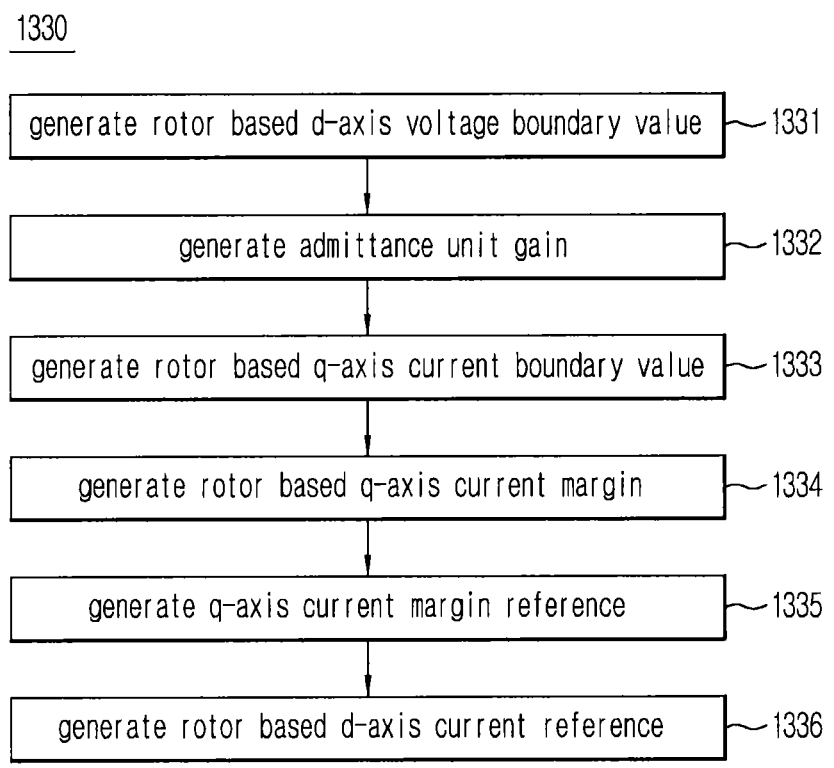
FIG. 12 illustrates a method to generate a d-axis current reference according to an embodiment of the present invention.

FIG. 12 is a flowchart illustrating a method to generate a d-axis current reference according to an embodiment of the present invention.

Referring to FIG. 7A, the instantaneous voltage limit circle a9, the average voltage limit curve a10 and load torque curves a11 and a12 are illustrated on a d-axis and q-axis current plane.

In a motor driving system having a large-capacitance capacitor, the instantaneous voltage limit circle a9 is changed only by the motor velocity because variation in the DC-link voltage 36 can be ignored. However, when a small-capacitance capacitor may be used for the DC link (not shown), the DC-link voltage 36 varies to the double system frequency 202 even at a fixed velocity. Accordingly, a new "average voltage limit circle a10" is defined.

The instantaneous voltage limit circle a9 is a representation of a voltage limit value, which changes periodically at a specific motor velocity, on the d-axis and q-axis current plane.

The average voltage limit curve a10 is a representation of the average of the voltage limit value, which changes periodically at the specific motor velocity, for a half cycle of the source frequency on the d-axis and q-axis current plane.

The average voltage limit curve a10 can be obtained by Equations 10 and 11.

$$V_{dc} = \|V_{dc}\| \sin(\theta_g)$$ Equation 10

In Equation 10, $\|V_{dc}\|$ is denotes a maximum value of the DC-link voltage 36 and $\theta_g$ denotes the system angle 201.

$$i^r_{qs} = \frac{1}{\omega_r L_q} \sqrt{\frac{V_{dc}^2}{3} - \{\omega_r(\lambda_{pm} + L_d i^r_{ds})\}^2}$$ [Equation 11]

In Equation 11, $i_{qs}^r$ denotes the rotor based q-axis current, $L_d$ denotes d-axis inductance, $L_q$ denotes q-axis inductance, $\omega_r$ represents the rotor angular velocity, $\lambda_{pm}$ represents magnetic flux of the rotor based q-axis stator, $i_{ds}^r$ represents the rotor based d-axis current, and $V_{dc}^2$ represents the DC-link voltage square.

The rotor based q-axis current that can be obtained within the range of the instantaneous voltage limit value can be calculated by Equations 10 and 11. The average of the rotor based q-axis current that can flow for one cycle can be obtained by averaging the rotor based q-axis current for one cycle.

The average voltage limit curve a10 is obtained by calculating the average of the rotor based q-axis current while changing the rotor based d-axis current and representing the average on the current plane.

However, it is necessary to consider motor parameters when the average voltage limit curve is generated according to Equation 11.

Accordingly, the present invention can use a rotor based d-axis voltage boundary value 413 to obtain the correct average voltage limit curve without considering the motor parameters, which will be described in detail below through Equation 12.

Referring to FIG. 7A, the instantaneous voltage limit circle a9 and the average voltage limit curve a10 are illustrated on the d-axis and q-axis current plane.

For example, to control a motor torque to be 2.5 [Nm], the rotor based d-axis current reference 61 at which the average voltage limit curve a10 meets a motor generated torque curve a12 needs to be maintained at approximately −2.5 [A] and the rotor based q-axis current reference 62 needs to be maintained at approximately 8 [A].

Referring to FIG. 12, the inverter control apparatus 1 can generate the rotor based d-axis voltage boundary value 413 using the rotor based q-axis voltage limit value 102 and the DC-link voltage 36.

The inverter control apparatus 1 performs computation according to Equation 12. Here, Equation 12 is a modification of Equation 11 and corresponds to an equation with respect to voltage.

That is, Equation 12 is obtained by modifying Equation 11 into an equation with respect to voltage.

$$V_{ds}^{r*}\_boundary = \left(\sqrt{\frac{V_{dc}^2}{3} - (V_{qs-sat}^{r*})^2}\right)$$ [Equation 12]

In Equation 12, $V_{dc}^2$ denotes the DC-link voltage square 211, $V_{qs-sat}^{r*}$ denotes the rotor based q-axis voltage limit value 102, and $V_{ds}^{r*}\_boundary$ represents the rotor based d-axis voltage boundary value 413.

The rotor based d-axis voltage boundary value 413 refers to a maximum instantaneous voltage that can be applied to a d axis when the periodically varying DC-link voltage 36 and the rotor based q-axis voltage limit value 102 are taken into account.

Equation 12 uses feedback of the rotor based q-axis voltage limit value $V_{qs-sat}^{r*}$.

Since a counter electromotive force component $\omega_r(\lambda_{pm} + L_d i_{ds}^r)$ appearing at rotor based q-axis and transient voltage $$L_q \frac{di_{qs}^r}{dt}$$

before sampling before a current reference is generated are reflected in the rotor based q-axis voltage limit value, Equation 12 is preciser than Equation 11 and has an advantage of requiring no motor parameters (1331).

The inverter control apparatus 1 can generate a unit gain 415 ($=K_2=\omega_r L_q$) using the rotor based d-axis voltage limit value 101, the rotor based d-axis current reference 61 and the rotor based q-axis current reference 62.

For example, since the q-axis inductance $L_q$ largely varies according to load condition, the unit gain 415 can be obtained using a d-axis voltage equation (Equation 13) to design a controller robust to parameter error.

$$V_{ds}^r = R_s i_{ds}^r + L_d \frac{d}{dt} i_{ds}^r - \omega_r L_q i_{qs}^r \qquad \text{[Equation 13]}$$

In Equation 13, $V_{ds}^r$ denotes a rotor based d-axis voltage, $R_s$ denotes wire wound resistance of the stator, $i_{ds}^r$ denotes a rotor based d-axis current, $L_d$ represents d-axis inductance, $\omega_r$ represents the rotor angular velocity, and $L_q$ represents q-axis inductance (1332).

The inverter control apparatus 1c can generate the rotor based q-axis boundary value 417 ($i_{qs}^{r*}$–Boundary) using the rotor based d-axis voltage boundary value 413 and the unit gain 415.

The rotor based q-axis current boundary value 417 refers to a maximum rotor based q-axis current that can be obtained at the current operating point (velocity and load conditions). The rotor based q-axis current boundary value 417 is obtained on the basis of the rotor based d-axis voltage boundary value 413 and the unit gain 415.

The average of the rotor based q-axis current boundary value 417 may be used to generate the rotor based d-axis current reference 61.

That is, the average of q-axis current that can flow during one cycle can be obtained by averaging the rotor based q-axis current boundary value 417 for one cycle of the DC-link voltage. The average voltage limit curve a10 is obtained by calculating the average of the rotor based q-axis current boundary value 417 while changing the rotor-based d-axis current and representing the average of the rotor based q-axis current boundary value 417 on the current plane.

For example, if the average of the rotor based q-axis current reference 62 that needs to be generated is greater than the average of the rotor based q-axis current boundary value 417, the inverter control apparatus 1 can increase the average of the rotor based q-axis current boundary value 417 by setting the rotor based d-axis current reference 61 to a negative value (1333).

The inverter control apparatus 1 can generate the rotor based q-axis current margin value 419 using the rotor based q-axis current boundary value 417 and the rotor based q-axis current reference 62. The rotor based q-axis current margin value 419 is obtained using a difference between the average of the rotor based q-axis current boundary value 417 and the rotor based q-axis current reference 62 (1334).

The inverter control apparatus 1 can generate the rotor based q-axis current margin reference 421 isomg the output torque command value 53.

The output torque command value 53 may refer to a value obtained by subtracting an anti-wind up value corresponding to a torque generated according to current limitation from the actually necessary torque.

Accordingly, the inverter control apparatus 1 can increase the rotor based-q-axis current margin reference 421 in a positive direction to compensate for insufficient torque (anti-wind up) due to current limitation.

For example, the inverter control apparatus 1 can generate the rotor based q-axis current margin reference 421 by dividing the anti-wind up value $T_{e\text{-}anti}$ of torque output by $k_T$.

When anti-windup of the torque is generated due to current limitation (e.g., generated torque is insufficient), the inverter control apparatus 1 can increase rotor based q-axis current density within current limitation by increasing the rotor based d-axis current reference 61 in a negative direction.

For example, if the rotor based q-axis current reference 62 that needs to be generated is greater than the average of the rotor based q-axis current boundary value 417, the inverter control apparatus 1 increases the rotor based q-axis current margin reference 421 in a positive direction.

As a result, the rotor based d-axis current reference 61 increases in the negative direction and the average of the rotor based q-axis current boundary value 417 corresponding to the increased rotor based d-axis current reference 61 also increases.

The rotor based q-axis current reference value 62 corresponding to the increased rotor based d-axis current reference 61 decreases.

On the contrary, in a steady state or when current is not limited, the inverter control apparatus 1 can set the rotor based q-axis current margin reference 421 to "0".

In this case, the rotor based d-axis current 61 may be determined such that the average of the rotor based q-axis current boundary value 417 equals the rotor based q-axis current reference 62.

Accordingly, the inverter control apparatus 1 can generate the best rotor based d-axis current reference 61 for the rotor based q-axis current reference 62 in any form.

When the generated torque is insufficient due to current limitation, the inverter control apparatus 1 can generate the rotor based q-axis current reference 62 within the range of the q-axis current boundary value by increasing the rotor based d-axis current reference 61 in the negative direction.

Conversely, in a steady state or when current is not limited, the inverter control apparatus 1 sets the q-axis current margin reference 421 to "0". In this case, the d-axis current is determined as a best value in a steady state regardless of the rotor based q-axis current reference 62.

The inverter control apparatus 1 can generate the error value 423 by subtracting the rotor based q-axis current margin reference 421 from the rotor based q-axis current margin value 419 using the rotor based q-axis current margin value 419 and the rotor based q-axis current margin reference 421.

The inverter control apparatus 1 can sequentially input the error value 423 to a low pass filter and a proportional integrator to generate the rotor based d-axis current reference 61 (1336).

Figure 13:
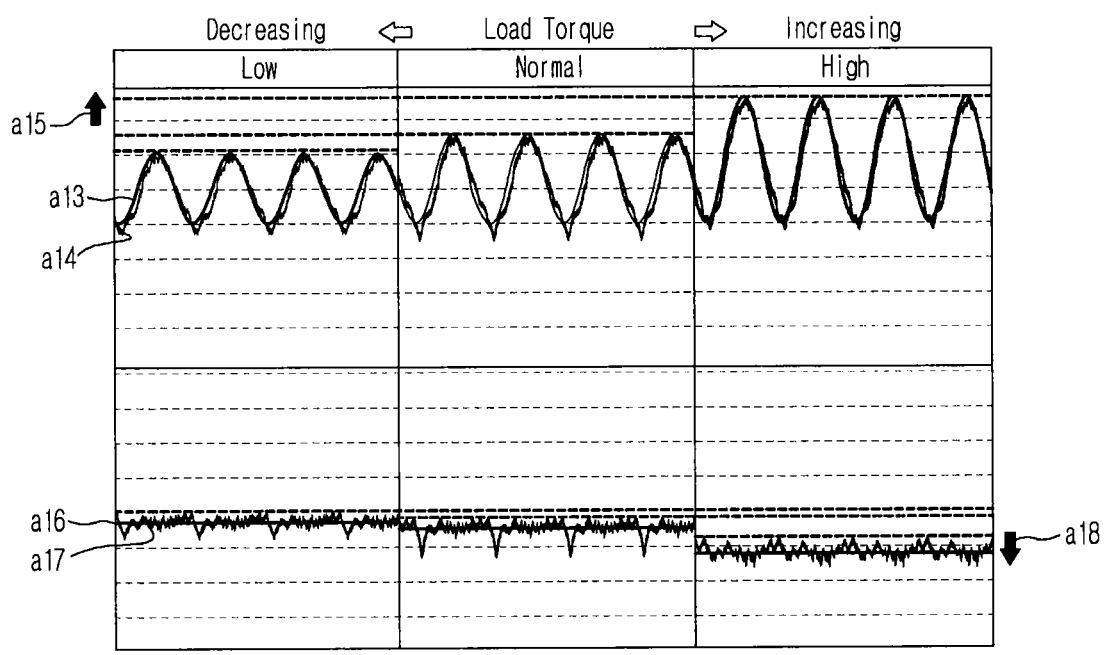
FIG. 13 illustrates a motor driving waveform when a compressor of a 1 kW air-conditioner is controlled at 5400 r/min according to an embodiment of the present invention.

FIG. 13 illustrates motor driving waveforms when a compressor of a 1 kW air-conditioner is controlled at 5400 r/min according to an embodiment of the present invention.

FIG. 13 illustrates a waveform a13 of the rotor based q-axis current reference, waveform a14 of a rotor based q-axis current measurement value, waveform a16 of the rotor based d-axis current reference, and waveform a17 of a rotor based d-axis current measurement value.

Referring to FIG. 13, when a load torque is increased, both the rotor based q-axis current reference and the rotor based q-axis current measurement value increase (a15).

When the load torque is increased, the rotor based reference d-axis current reference generated through average voltage limitation increases in a negative direction (a18) to secure a voltage margin for the increasing rotor based q-axis current.

Figure 14:
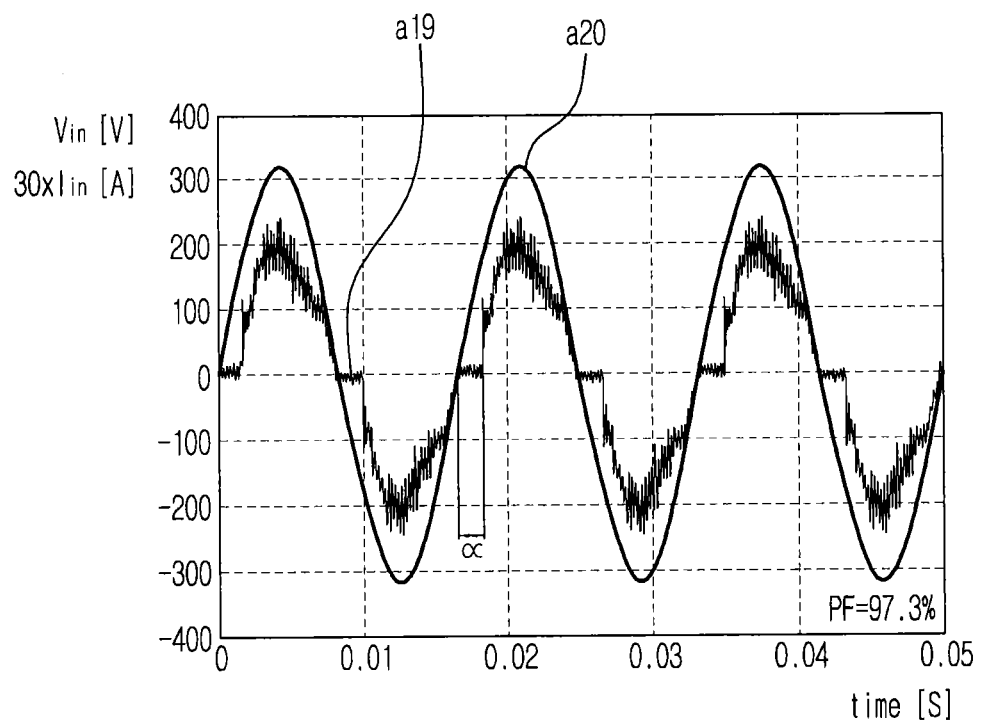
FIG. 14 illustrates waveforms of the current and voltage of input power according to an embodiment of the present invention.

FIG. 14 illustrates waveforms of the current and voltage of input power according to an embodiment of the present invention.

Referring to FIG. 14, a current waveform a19 and voltage waveform a20 of the input power are illustrated.

When harmonics and power factor of the input current are calculated in the case of a normal load torque size, the power factor is 97.3%. This is because q-axis current is synchronized with system voltage to be modified into $\sin^2\theta_g$.

Figure 15:
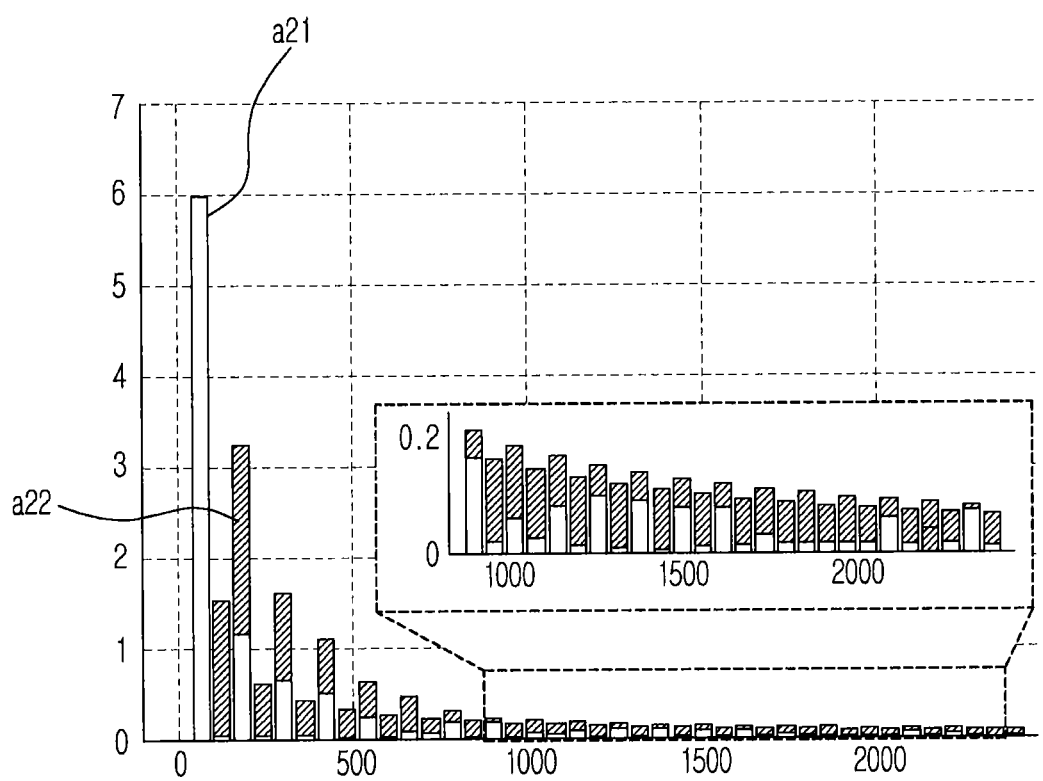
FIG. 15 illustrates an input current harmonics analysis result according to an embodiment of the present invention.

FIG. 15 illustrates an input current harmonics analysis result according to an embodiment of the present invention.

Referring to FIG. 15, input current harmonics a21 satisfy criteria a22 of IEC 61000-3-2 Class A.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An inverter control apparatus that controls an inverter having a DC-link voltage pulsating at double a system frequency, the inverter control apparatus comprising:
   a current sensor to sense an output current of the inverter;
   a voltage sensor to sense a DC-link voltage of the inverter; and
   a controller configured to:
      generate a q-axis current reference in a sine squared form;
      generate a q-axis current boundary value on a basis of the output current and the DC-link voltage, the q-axis current boundary value representing limit of the q-axis current reference due to variation of the DC-link voltage;
      generate an average of the q-axis current boundary value by averaging the q-axis current boundary value for a half cycle of the system frequency;
      generate a d-axis current reference based on the q-axis current reference and the average of the q-axis current boundary value; and
      drive a three-phase motor based on the d-axis current reference and the q-axis current reference.

2. The inverter control apparatus according to claim 1, wherein the controller comprises:
   a velocity controller to generate an output torque command value on the basis of the output current; and
   a current reference generator to generate the current reference corresponding to the output torque command value.

3. The inverter control apparatus according to claim 2, wherein the current reference generator comprises a system angle estimator to estimate at least one of a system angle, a system frequency, a double system angle and a double system frequency on the basis of the DC-link voltage.

4. The inverter control apparatus according to claim 3, wherein the current reference generator further comprises a q-axis current reference generator to generate a q-axis current reference in a sine squared form, which is synchronized with the system angle, on the basis of the system angle.

5. The inverter control apparatus according to claim 4, wherein the current reference generator further comprises a d-axis current reference generator to calculate the average of the periodically varying q-axis current boundary value and to generate a d-axis current reference on the basis of the average of the rotor based q-axis current boundary value and the q-axis current reference.

6. The inverter control apparatus according to claim 5, wherein the d-axis current reference generator comprises:
   a current margin calculator to calculate the average of the periodically varying q-axis current boundary value on the basis of the DC-link voltage and to generate a q-axis current margin value on the basis of the average of the rotor based q-axis current boundary value;
   a current margin reference unit to generate a q-axis current margin reference on the basis of the output torque command value; and
   a first adder to generate an error value by subtracting the q-axis current margin reference from the q-axis current margin value.

7. The inverter control apparatus according to claim 6, wherein the current margin calculator comprises:
   a d-axis voltage boundary value calculator to generate a d-axis voltage boundary value corresponding to a maximum instantaneous voltage that can be applied to a d axis on the basis of the DC-link voltage;
   a unit gain calculator to generate a unit gain that changes a voltage value into a current value;
   a q-axis current boundary converter to generate a q-axis current boundary value on the basis of the d-axis voltage boundary value and the unit gain; and
   a q-axis current margin calculator to subtract the q-axis current reference from the average of the rotor based q-axis current boundary value to generate a q-axis margin value.

8. The inverter control apparatus according to claim 6, wherein the current margin reference unit sets the d-axis current reference to a positive value such that the d-axis current reference is set to a negative value when a generated torque is insufficient due to current limitation.

9. The inverter control apparatus according to claim 6, wherein the current margin reference unit sets the q-axis current margin reference to "0" in a steady state or when current is not limited.

10. The inverter control apparatus according to claim 4, wherein the q-axis current reference generator comprises:
    a sine square calculator to generate a unit sine square waveform having the system angle;
    a q-axis current reference converter to generate a q-axis current reference corresponding to the output torque command value;
    a first multiplier to multiply the unit sine square waveform by the q-axis current reference to generate a q-axis current reference in a sine squared form;
    a current gain setting unit to generate a current gain that makes the average of the output torque command value equal to the average of a current reference modified torque generated according to the q-axis current reference; and
    a second multiplier to multiply the q-axis current reference in a sine squared form by the current gain to generate a q-axis current reference.

11. The inverter control apparatus according to claim 10, wherein the current gain setting unit sets the current gain to "2".

12. The inverter control apparatus according to claim 3, wherein the system angle estimator comprises:
    a DC-link voltage square calculator to square the DC-link voltage to generate a DC-link voltage square;
    a band pass filter to generate a double system frequency component value having a frequency twice the system frequency on the basis of the DC-link voltage square and the double system frequency;
    a phase retarder to generate a 90° phase-retarded value having a phase retarded by 90° from the double system frequency component value;
    a fifth frame converter to generate a synchronous reference frame based d-axis virtual voltage and a synchronous reference frame based q-axis virtual voltage, which are constants and have a phase difference therebetween, on the basis of the 90°-phase-retarded value, a value obtained by multiplying the double system frequency component value by "−1", and the double system angle; and a phase lock unit to generate at least one of the system angle, the system frequency, the double system angle, and the double system frequency on the synchronous reference frame based d-axis virtual voltage and constant "0".

13. The inverter control apparatus according to claim 12, wherein the phase lock unit comprises an all-pass filter or a secondary general integrator to retard a phase.

14. The inverter control apparatus according to claim 12, wherein the phase lock unit comprises a phase lock loop to lock the phase of a received signal and keep the frequency of an output signal uniform.

15. A method to control an inverter control apparatus that includes a current sensor, a voltage sensor and a controller and controls an inverter having a DC-link voltage pulsating at double a system frequency, the method comprising:

generating a q-axis current reference in a sine squared form;

generating a q-axis current boundary value on a basis of the output current and the DC-link voltage, the q-axis current boundary value representing limit of the q-axis current reference due to variation of the DC-link voltage;

generating an average of the q-axis current boundary value by averaging the q-axis current boundary value for a half cycle of the system frequency;

generating a d-axis current reference based on the q-axis current reference and the average of the q-axis current boundary value; and driving a three-phase motor based on the d-axis current reference and the q-axis current reference.

16. The method according to claim 15, wherein generating the q-axis current reference comprises estimating at least one of a system angle, a system frequency, a double system angle and a double system frequency on the basis of the DC-link voltage.

17. The method according to claim 16, wherein the generating the q-axis current reference further comprises generating a q-axis current reference in a sine squared form, which is synchronized with the system angle, on the basis of the system angle.

18. The method according to claim 17, wherein generating the q-axis current reference comprises:

generating a unit sine square waveform having the system angle;

generating a q-axis current reference corresponding to the output torque command value;

multiplying the unit sine square waveform by the q-axis current reference to generate a q-axis current reference in a sine squared form;

generating a current gain that makes the average of the output torque command value equal to the average of a current reference modified torque generated according to the q-axis current reference; and multiplying the q-axis current reference in a sine squared form by the current gain to generate a q-axis current reference.

19. The method according to claim 18, wherein the current gain setting unit sets the current gain to "2".

20. The method according to claim 16, wherein estimating at least one of the system angle, the system frequency, the double system angle and the double system frequency comprises:

squaring the DC-link voltage to generate a DC-link voltage square;

generating a double system frequency component value having a frequency twice the system frequency on the basis of the DC-link voltage square and the double system frequency;

generating a 90° phase-retarded value having a phase retarded by 90° from the double system frequency component value;

generating a synchronous reference frame based d-axis virtual voltage and a synchronous reference frame based q-axis virtual voltage, which are constants and have a phase difference therebetween, on the basis of the 90°-phase-retarded value, a value obtained by multiplying the double system frequency component value by "−1", and the double system angle; and generating at least one of the system angle, the system frequency, the double system angle, and the double system frequency on the synchronous reference frame based d-axis virtual voltage and constant "0".

21. The method according to claim 15, wherein generating the d-axis current reference comprises:

generating a d-axis voltage boundary value corresponding to a maximum instantaneous voltage that can be applied to a d axis on the basis of the DC-link voltage;

generating a unit gain that changes a voltage value into a current value;

generating a q-axis current boundary value on the basis of the d-axis voltage boundary value and the unit gain;

subtracting the q-axis current reference from the average of the q-axis current boundary value to generate a q-axis margin value;

generating a q-axis current margin reference on the basis of the output torque command value;

generating an error value by subtracting the q-axis current margin reference from the q-axis current margin value; and sequentially applying the error value to a low pass filter and a proportional integrator to generate a d-axis current reference.

22. The method according to claim 21, wherein generating the d-axis current reference comprises setting the d-axis current reference to a positive value such that the d-axis current reference is set to a negative value when generated torque is insufficient due to current limitation.

23. The method according to claim 21, wherein apparatus generating the d-axis current reference comprises setting the q-axis current margin reference to "0" in a steady state or when current is not limited.

24. A controller to control an apparatus comprising:

a current sensor to sense an output current of the apparatus;

a voltage sensor to sense a DC-link voltage of the apparatus; and a processor configured to:

generate a q-axis current reference in a sine squared form;

generate a q-axis current boundary value on a basis of the output current and the DC-link voltage, the q-axis current boundary value representing limit of the q-axis current reference due to variation of the DC-link voltage;

generate an average of the q-axis current boundary value by averaging the q-axis current boundary value for a half cycle of the system frequency; and generate a d-axis current reference based on the q-axis current reference and the average of the q-axis current boundary value.

25. A method to control an inverter, the method comprising:
- sensing an output current and a DC-link voltage of the inverter;
- generating a q-axis current reference in a sine squared form;
- generating a q-axis current boundary value on a basis of the output current and the DC-link voltage, the q-axis current boundary value representing limit of the q-axis current reference due to variation of the DC-link voltage;
- generating an average of the q-axis current boundary value by averaging the q-axis current boundary value for a half cycle of the system frequency; and
- generating a d-axis current reference based on the q-axis current reference and the average of the q-axis current boundary value.

* * * * *

UNITED STATES PATENT AND TRADEMARK OFFICE
CERTIFICATE OF CORRECTION

PATENT NO. : 9,136,790 B2  
APPLICATION NO. : 13/684316  
DATED : September 15, 2015  
INVENTOR(S) : Park et al.

Page 1 of 1

It is certified that error appears in the above-identified patent and that said Letters Patent is hereby corrected as shown below:

On the title page item [57],

Line 4 delete "DC Link." and insert --DC-link.--, therefor.

Line 14 delete "DC Link" and insert --DC-link--, therefor.

In the claims

Claim 7, Column 30, Lines 13-14

Delete "d axis" and insert --d-axis--, therefor.

Claim 21, Column 32, Line 25

Delete "d axis" and insert --d-axis--, therefor.

Signed and Sealed this  
Fifteenth Day of December, 2015

Michelle K. Lee  
*Director of the United States Patent and Trademark Office*